(12) United States Patent
Tang et al.

(10) Patent No.: US 11,758,250 B1
(45) Date of Patent: Sep. 12, 2023

(54) IMAGE CAPTURING MODULE AND ELECTRONIC DEVICE

(71) Applicant: Wistron Corporation, New Taipei (TW)

(72) Inventors: Liang Tang, New Taipei (TW); Ai Xu, New Taipei (TW); Yougang Wang, New Taipei (TW); Guo-Wei Huang, New Taipei (TW); Wei Dong, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 17/739,192

(22) Filed: May 9, 2022

(30) Foreign Application Priority Data

Mar. 10, 2022  (CN) .......................... 202210240532.7

(51) Int. Cl.
    *H04N 23/51* (2023.01)
    *H04N 23/52* (2023.01)
    *H04N 23/53* (2023.01)

(52) U.S. Cl.
    CPC ............. *H04N 23/51* (2023.01); *H04N 23/52* (2023.01); *H04N 23/53* (2023.01)

(58) Field of Classification Search
    CPC ....... H04N 23/51; H04N 23/52; H04N 523/53
    See application file for complete search history.

(56) References Cited

U.S. PATENT DOCUMENTS

| | | | |
|---|---|---|---|
| 8,654,247 B2 | 2/2014 | Chang | |
| 9,197,850 B2 | 11/2015 | Koberling | |
| 11,372,317 B2 | 6/2022 | Hsu et al. | |
| 2012/0127362 A1 | 5/2012 | Chang | |
| 2015/0009398 A1* | 1/2015 | Shih | H04N 23/74 348/370 |
| 2018/0013986 A1* | 1/2018 | Chien | F21V 29/00 |
| 2021/0072625 A1* | 3/2021 | Ye | H04N 23/51 |
| 2021/0132476 A1 | 5/2021 | Hsu et al. | |
| 2022/0006886 A1* | 1/2022 | Huang | H04N 23/51 |
| 2022/0407996 A1* | 12/2022 | Goh | H04N 23/13 |

FOREIGN PATENT DOCUMENTS

| | | |
|---|---|---|
| CN | 110933285 | 3/2020 |
| CN | 112822381 | 5/2021 |
| CN | 112879779 | 6/2021 |

(Continued)

OTHER PUBLICATIONS

"Office Action of Japan Counterpart Application", dated Mar. 22, 2023, p. 1-p. 4.

(Continued)

*Primary Examiner* — Amy R Hsu
(74) *Attorney, Agent, or Firm* — JCIPRNET

(57) ABSTRACT

An image capturing module includes a main casing, an image capturing unit, a knob cover, and at least one shielding structure. The image capturing unit is disposed in the main casing. The knob cover is rotatably connected to the main casing. The shielding structure is disposed on the main casing and movably connected to the knob cover. The knob cover drives the shielding structure to shield the image capturing unit. An electronic device including a display and the image capturing module is also provided.

19 Claims, 27 Drawing Sheets

(56) References Cited

FOREIGN PATENT DOCUMENTS

| | | |
|---|---|---|
| CN | 112911224 | 6/2021 |
| CN | 213522046 | 6/2021 |
| JP | 2006155353 | 6/2006 |
| JP | 2007121963 | 5/2007 |
| JP | 3177336 | 7/2012 |
| JP | 2014167559 | 9/2014 |
| KR | 101550174 | 9/2015 |
| TW | 200813599 | 3/2008 |
| TW | 201222137 | 6/2012 |
| TW | 202118966 | 5/2021 |

OTHER PUBLICATIONS

"Office Action of Taiwan Counterpart Application", dated Jul. 18, 2023, p. 1-p. 10.

* cited by examiner

IMAGE CAPTURING MODULE AND ELECTRONIC DEVICE

CROSS-REFERENCE TO RELATED APPLICATION

This application claims the priority benefit of Chinese application no. 202210240532.7, filed on Mar. 10, 2022. The entirety of the above-mentioned patent application is hereby incorporated by reference herein and made a part of this specification.

BACKGROUND

Technical Field

The disclosure relates to an electronic assembly and an electronic device. In particular, the disclosure relates to an image capturing module and an electronic device including the same.

Description of Related Art

An increasing number of desktop displays and all-in-one (AIO) computers are provided with a camera for a user to conveniently perform a video conversation, for example. To close a shutter of the camera when not being in use, the opening and closing of the shutter is generally controlled by utilizing electronic driving. Also, to make the camera accurately correspond to a position of the user, change of an inclination angle of the camera is generally controlled by utilizing electronic driving. However, electronic driving as mentioned above has a complicated design and high costs.

SUMMARY

The disclosure provides an image capturing module to achieve control of shutter opening and closing and inclination angle adjustment with a simple and low-cost design.

The disclosure provides an electronic device, whose image capturing module achieves control of shutter opening and closing and inclination angle adjustment with a simple and low-cost design.

According to an embodiment of the disclosure, an image capturing module includes a main casing, an image capturing unit, a knob cover, and at least a shielding structure. The image capturing unit is disposed in the main casing. The knob cover is rotatably connected to the main casing. The shielding structure is disposed on the main casing and movably connected to the knob cover. The knob cover drives the shielding structure to shield the image capturing unit.

In an embodiment of the disclosure, the main casing has at least one blocking wall. The shielding structure is actuated relative to the image capturing unit to cause the blocking wall to stop the shielding structure.

In an embodiment of the disclosure, the main casing has at least one first positioning part. The shielding structure or the knob cover has a second positioning part. The shielding structure is actuated relative to the image capturing unit to position the second positioning part at the first positioning part.

In an embodiment of the disclosure, the main casing has an opening hole. The opening hole corresponds to a lens of the image capturing unit. The knob cover drives the shielding structure to shield the opening hole.

In an embodiment of the disclosure, one of the main casing and the knob cover has at least one arc-shaped groove part. The arc-shaped groove part extends around a rotational axis of the knob cover. The other one of the main casing and the knob cover has at least one arc-shaped engaging part. The arc-shaped engaging part extends around the rotational axis of the knob cover. The arc-shaped engaging part is engaged with the arc-shaped groove part.

In an embodiment of the disclosure, a gap is present between the arc-shaped engaging part and the arc-shaped groove part.

In an embodiment of the disclosure, the knob cover has at least one connection hole. The shielding structure has a connection pillar. The connection pillar is rotatably and slidably connected to the connection hole.

In an embodiment of the disclosure, the shielding structure includes a linking rod and a shielding member. The linking rod is connected between the knob cover and the shielding member. The knob cover is adapted to drive the shielding member to be translated by the linking rod.

In an embodiment of the disclosure, the shielding structure includes a linking rod and a shielding member. The linking rod is connected between the knob cover and the shielding member. The knob cover is adapted to drive the shielding member to be rotated by the linking rod.

In an embodiment of the disclosure, the linking rod is movably connected to the shielding member, or the linking rod is integrally formed to be connected to the shielding member.

In an embodiment of the disclosure, the shielding structure includes a plurality of shielding structures. Each of the shielding structures has an inclined surface. The shielding structures shield the image capturing unit. The inclined surface of each of the shielding structures leans against the inclined surface of another one of the shielding structures.

In an embodiment of the disclosure, the shielding structure includes a plurality of shielding structures. One of the shielding structures has an extension part. The shielding structures shield the image capturing unit. The extension part covers a gap between the shielding structures.

According to an embodiment of the disclosure, an image capturing module includes a bracket, a main casing, an image capturing unit, a knob cover, and at least one shielding structure. The main casing is slidably disposed on the bracket along an arc-shaped sliding path. The image capturing unit is disposed in the main casing. An inclination angle of the image capturing module is adapted to change as the main casing slides along the arc-shaped sliding path. The knob cover is rotatably connected to the main casing. The shielding structure is disposed on the main casing and movably connected to the knob cover. The knob cover drives the shielding structure to shield the image capturing unit.

In an embodiment of the disclosure, the bracket includes a first assembly and a second assembly. The first assembly has an arc-shaped sliding space. The second assembly is slidably disposed in the arc-shaped sliding space. The main casing is fixed on the second assembly.

In an embodiment of the disclosure, the first assembly has at least one pillar body. The second assembly has at least one arc-shaped sliding groove. The pillar body is disposed through the arc-shaped sliding groove. Two opposite distal ends of the arc-shaped sliding groove are adapted to stop the pillar body to limit a sliding range of the second assembly relative to the first assembly.

In an embodiment of the disclosure, the second assembly has a plurality of ribs configured to contact the first assembly.

In an embodiment of the disclosure, the bracket includes a friction member. The friction member is fixed on the first assembly and contacts the second assembly.

In an embodiment of the disclosure, the friction member has a plurality of ribs configured to contact the second assembly. The first assembly has a plurality of ribs configured to contact the friction member.

According to an embodiment of the disclosure, an electronic device includes a display and an image capturing module. The image capturing module is disposed at a top end of the display and includes a main casing, an image capturing unit, a knob cover, and at least a shielding structure. The image capturing unit is disposed in the main casing. The knob cover is rotatably connected to the main casing. The shielding structure is disposed on the main casing and movably connected to the knob cover. The knob cover drives the shielding structure to shield the image capturing unit.

In an embodiment of the disclosure, the image capturing module includes a bracket. The bracket is disposed at the top end of the display. The main casing is slidably disposed on the bracket along an arc-shaped sliding path. An inclination angle of the image capturing module is adapted to change as the main casing slides along the arc-shaped sliding path.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
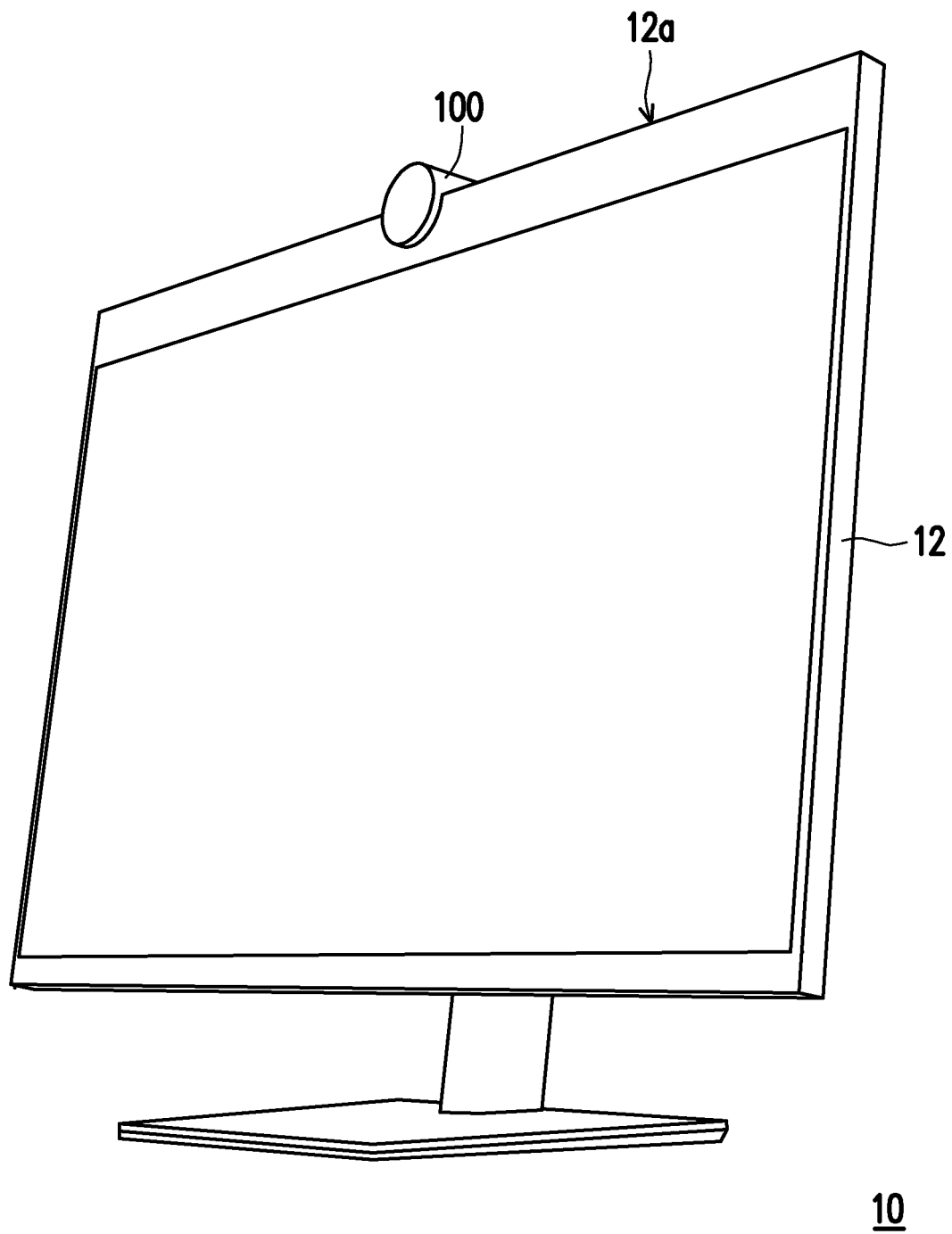
FIG. 1 is a perspective view of an electronic device according to an embodiment of the disclosure.

FIG. 1 is a perspective view of an electronic device according to an embodiment of the disclosure. With reference to FIG. 1, an electronic device 10 of this embodiment includes a display 12 and an image capturing module 100. The image capturing module 100 is disposed on a top end 12*a* of the display 12. The display 12 may be a desktop display as shown in FIG. 1, or may be a display screen of an all-in-one (AIO) computer, whose form is not limited by the disclosure.

Figure 2:
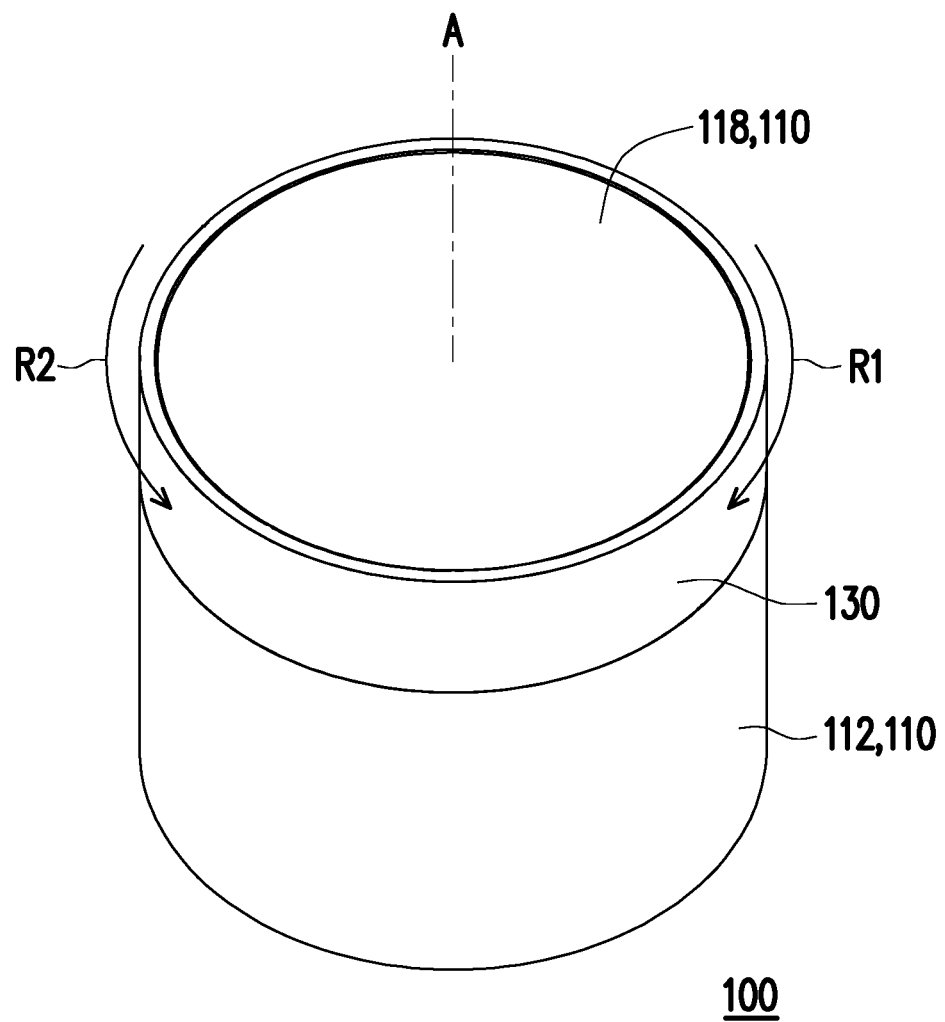
FIG. 2 is a perspective view of the image capturing module of FIG. 1.
Figure 3:
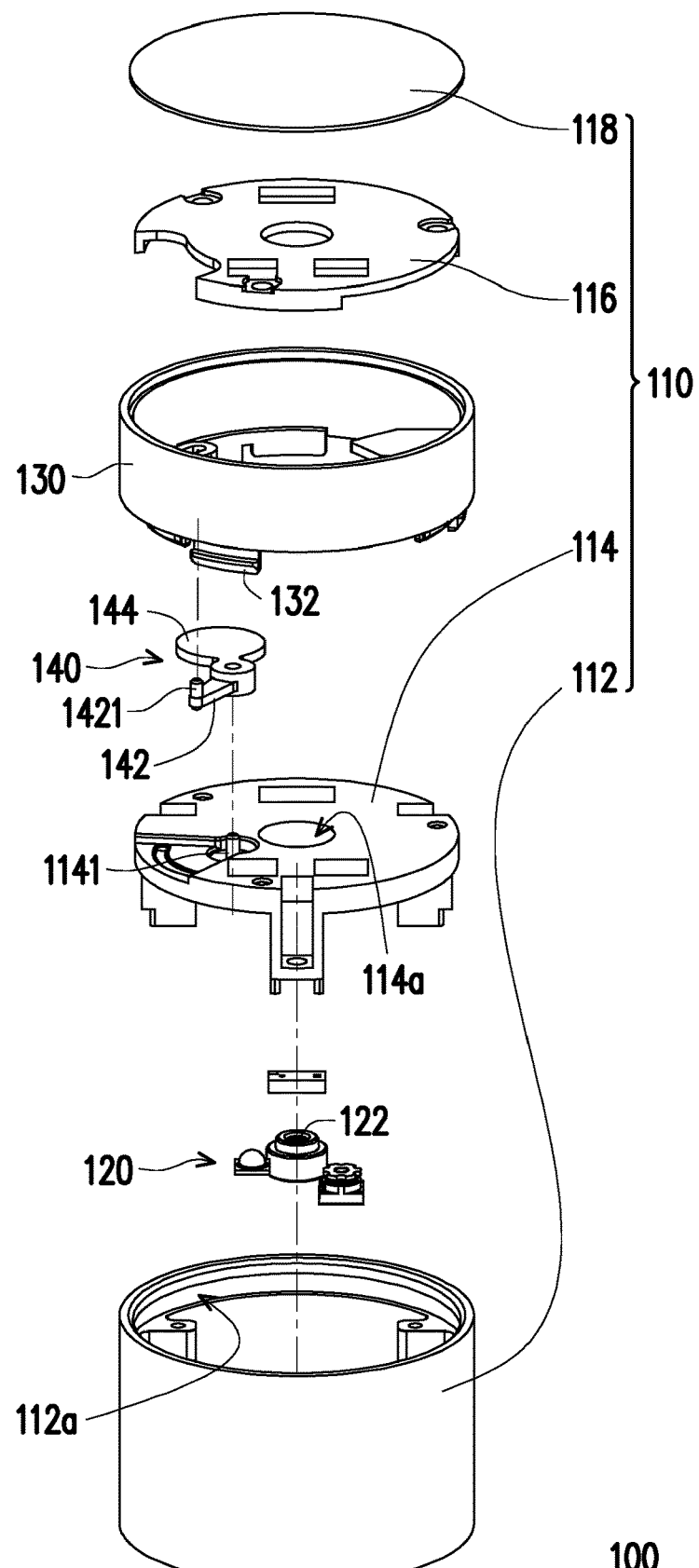
FIG. 3 is an exploded view of the image capturing module of FIG. 2.
Figure 4:
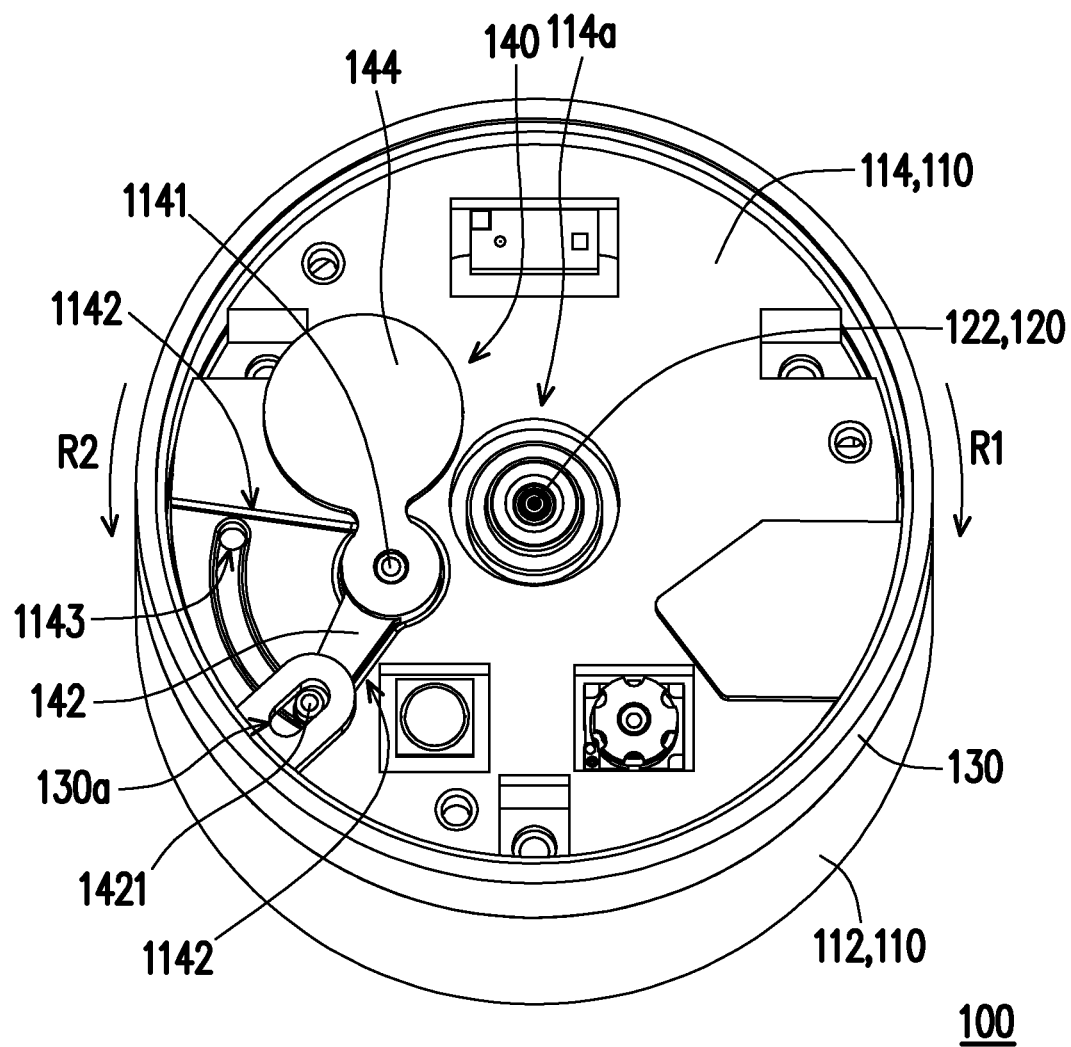
FIG. 4 is a perspective view of some members of the image capturing module of FIG. 2.

FIG. 2 is a perspective view of the image capturing module of FIG. 1. FIG. 3 is an exploded view of the image capturing module of FIG. 2. FIG. 4 is a perspective view of some members of the image capturing module of FIG. 2. With reference to FIG. 2 to FIG. 4, the image capturing module 100 of this embodiment includes a main casing 110, an image capturing unit 120, a knob cover 130, and a shielding structure 140. The main casing 110 includes a sleeve 112, a lower cover 114, an upper cover 116, and a light-transmissive plate 118. The image capturing unit 120 is disposed in the sleeve 112. The lower cover 114 is disposed at a top part of the sleeve 112 and covers the image capturing unit 120, and the lower cover 114 has an opening hole 114*a*. The opening hole 114*a* corresponds to a lens 122 of the image capturing unit 120. The upper cover 116 is disposed on the lower cover 114. The shielding structure 140 is disposed in the main casing 110 and located between the lower cover 114 and the upper cover 116. The knob cover 130 is rotatably connected to the main casing 110 and surrounds the lower cover 114 and the upper cover 116. The shielding structure 140 is movably connected to the knob cover 130.

Figure 5:
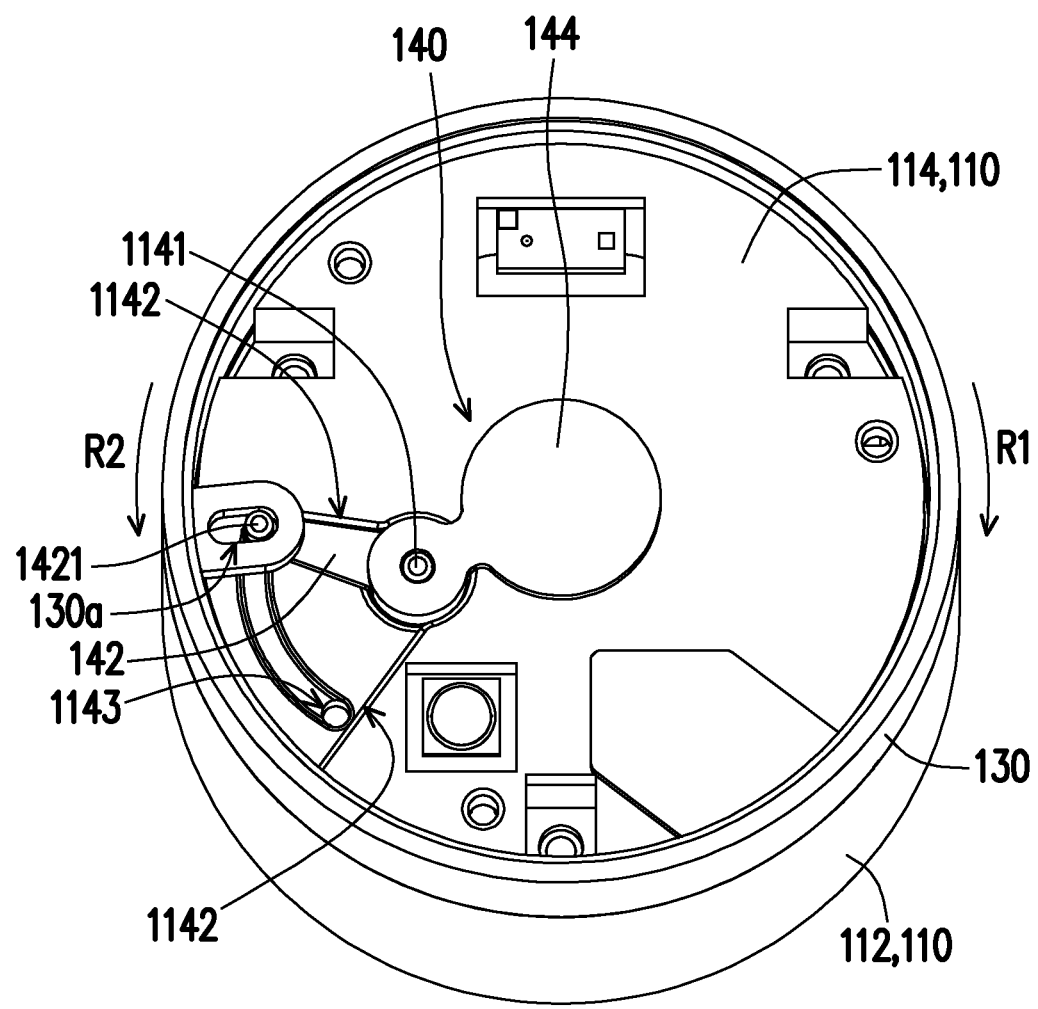
FIG. 5 shows the shielding structure of FIG. 4 actuated to a different state.

FIG. 5 shows the shielding structure of FIG. 4 actuated to a different state. When the image capturing module 100 is not in use, the user may apply a force to the knob cover 130 to rotate the knob cover 130 relative to the main casing 110 along a first rotational direction R1, driving the shielding structure 140 to be actuated from the state shown in FIG. 4 to the state shown in FIG. 5 to shield the opening hole 114*a* and the lens 122 of the image capturing unit 120, that is, to close the shutter. Moreover, when the image capturing module 100 is to be used, the user may apply a force to the knob cover 130 to rotate the knob cover 130 relative to the main casing 110 along a second rotational direction R2 opposite to the first rotational direction R1, driving the shielding structure 140 to be actuated from the state shown in FIG. 5 to the state shown in FIG. 4 to expose the opening hole 114a and the lens 122 of the image capturing unit 120, that is, to open the shutter.

Figure 6:
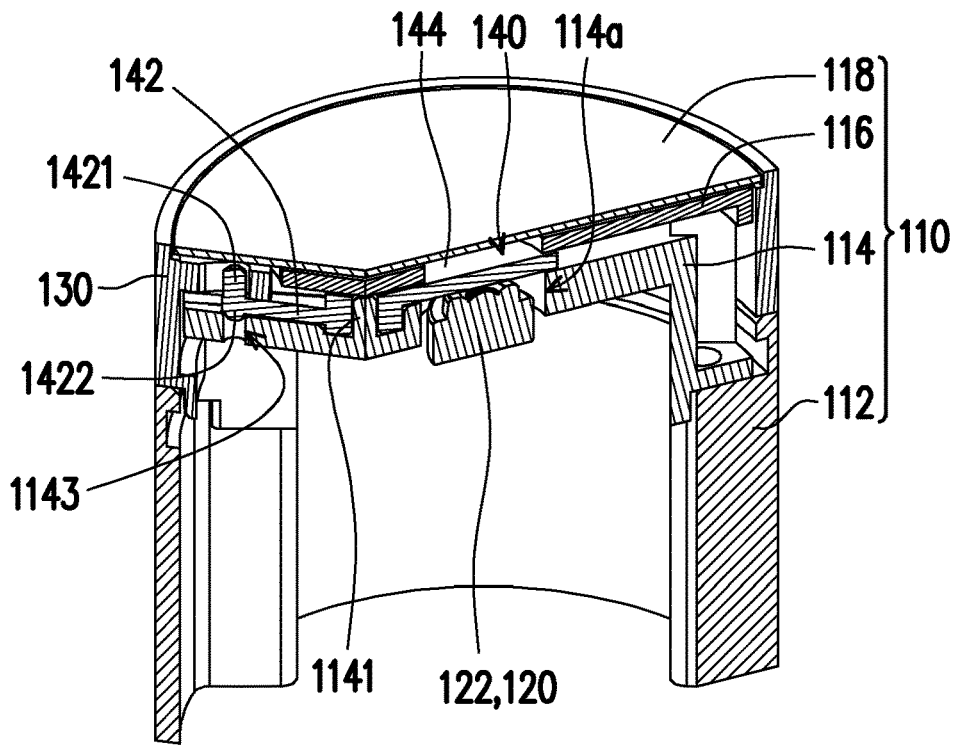
FIG. 6 is a perspective view of a partial structure of the image capturing module of FIG. 2.

FIG. 6 is a perspective view of a partial structure of the image capturing module of FIG. 2. With reference to FIG. 4 to FIG. 6, to be specific, the shielding structure 140 of this embodiment includes a linking rod 142 and a shielding member 144. The linking rod 142 has a connection pillar 1421 at one end of the linking rod 142. The knob cover 130 has a connection hole 130a. The connection pillar 1421 is rotatably and slidably connected to the connection hole 130a. The linking rod 142 is connected to the shielding member 144 at the other end of the linking rod 142. The shielding structure 140 is pivotally connected to a protruding pillar 1141 of the lower cover 114 at the connection between the linking rod 142 and the shielding member 144. Therefore, when the knob cover 130 is rotated, the knob cover 130 drives the shielding member 144 to be rotated between the state shown in FIG. 4 and the state shown in FIG. 5 by the linking rod 142. In this embodiment, the linking rod 142 and the shielding member 144 are, for example, integrally form to be connected to each other, which is not limited by the disclosure.

With reference to FIG. 4 and FIG. 5, in this embodiment, the lower cover 114 of the main casing 110 has a plurality of blocking walls 1142. The shielding structure 140 is actuated relative to the image capturing unit 120 to cause the blocking walls 1142 to stop the shielding structure 140. Specifically, when the shielding structure 140 shields the image capturing unit 120 as shown in FIG. 5 or exposes the image capturing unit 120 as shown in FIG. 4, the blocking walls 1142 stop the linking rod 142 of the shielding structure 140 to achieve limiting of the actuation range of the shielding structure 140, to limit the position of the shielding structure 140 to the state shown in FIG. 4 or the state shown in FIG. 5.

In this embodiment, the lower cover 114 of the main casing 110 further has a plurality of first positioning parts 1143 (shown as positioning holes in FIG. 4 to FIG. 6). The linking rod 142 of the shielding structure 140 has a corresponding second positioning part 1422 (shown as the bottom end of the connection pillar 1421 in FIG. 6). The shielding structure 140 is actuated relative to the image capturing unit 120 to position the second positioning part 1422 at the first positioning parts 1143. Specifically, when the shielding structure 140 shields the image capturing unit 120 as shown in FIG. 5 or exposes the image capturing unit 120 as shown in FIG. 4, the second positioning part 1422 is positioned at the first positioning part 1143 to prevent the shielding structure 140 from unexpected deviation from the state shown in FIG. 4 or the state shown in FIG. 5. Moreover, the feel of the user during operation can be improved by the positioning of the second positioning part 1422 and the first positioning parts 1143.

Figure 7:
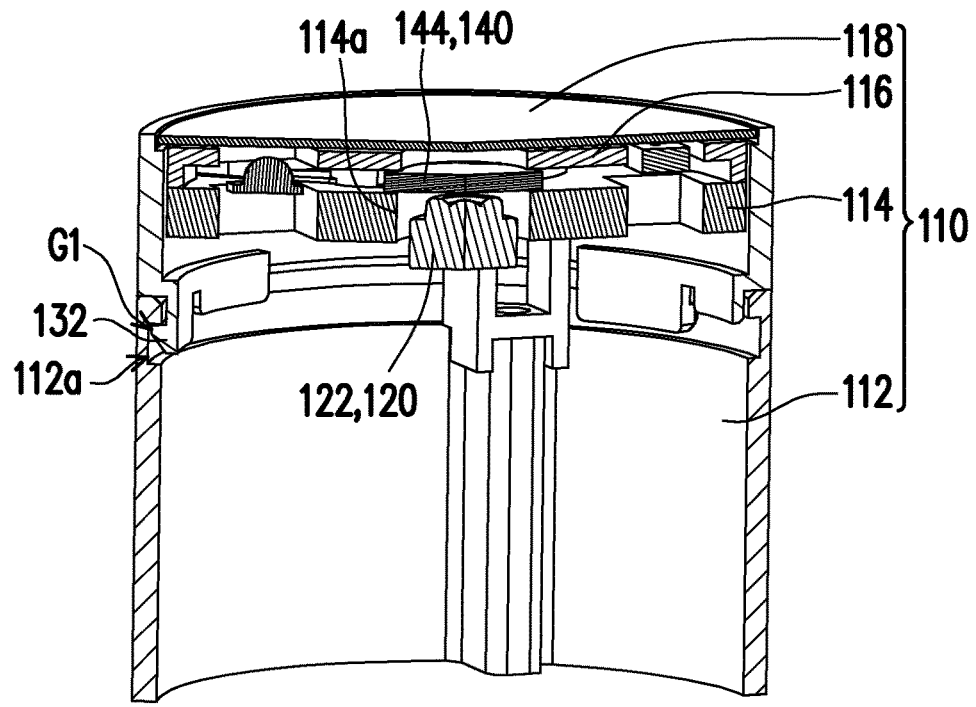
FIG. 7 is a perspective view of a partial structure of the image capturing module of FIG. 2.

FIG. 7 is a perspective view of a partial structure of the image capturing module of FIG. 2. With reference to FIG. 3 and FIG. 7, the sleeve 112 of the main casing 110 of this embodiment has an arc-shaped groove part 112a. The arc-shaped groove part 112a extends around a rotational axis A of the knob cover 130 (shown in FIG. 2). Accordingly, the knob cover 130 has a plurality of arc-shaped engaging parts 132. The arc-shaped engaging parts 132 extend around the rotational axis A of the knob cover 130 (shown in FIG. 2). The arc-shaped engaging parts 132 of the knob cover 130 are engaged with the arc-shaped groove part 112a of the sleeve 112, so that the knob cover 130 may not be separated from the sleeve 112 and can be rotated relative to the sleeve 112. A suitable gap G1 may be present between the arc-shaped engaging parts 132 and the arc-shaped groove part 112a to prevent from an overly great friction force between the arc-shaped engaging parts 132 and the arc-shaped groove part 112a resulting in difficulty in rotation of the knob cover 130 relative to the sleeve 112.

Figure 8:
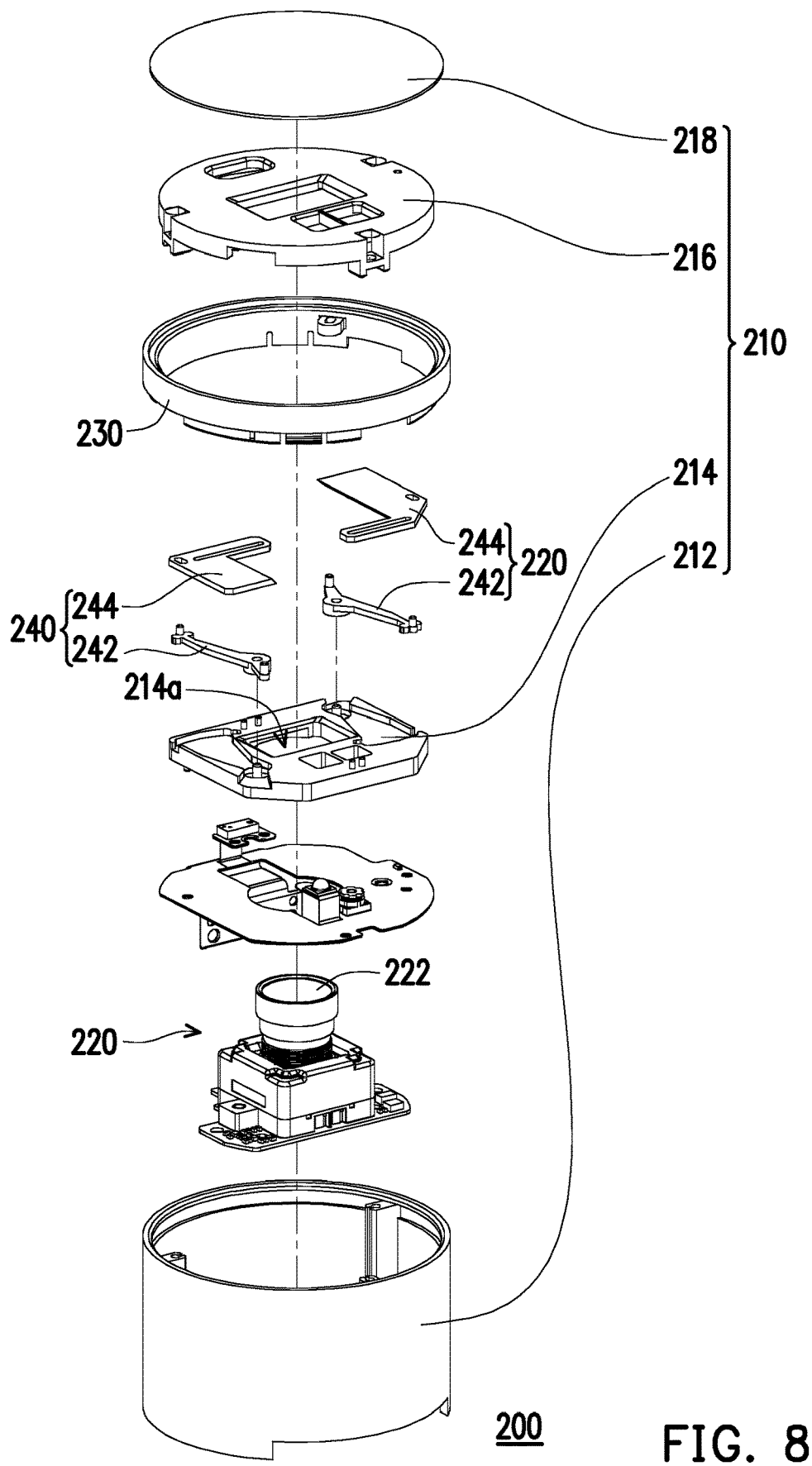
FIG. 8 is an exploded view of an image capturing module according to another embodiment of the disclosure.
Figure 9:
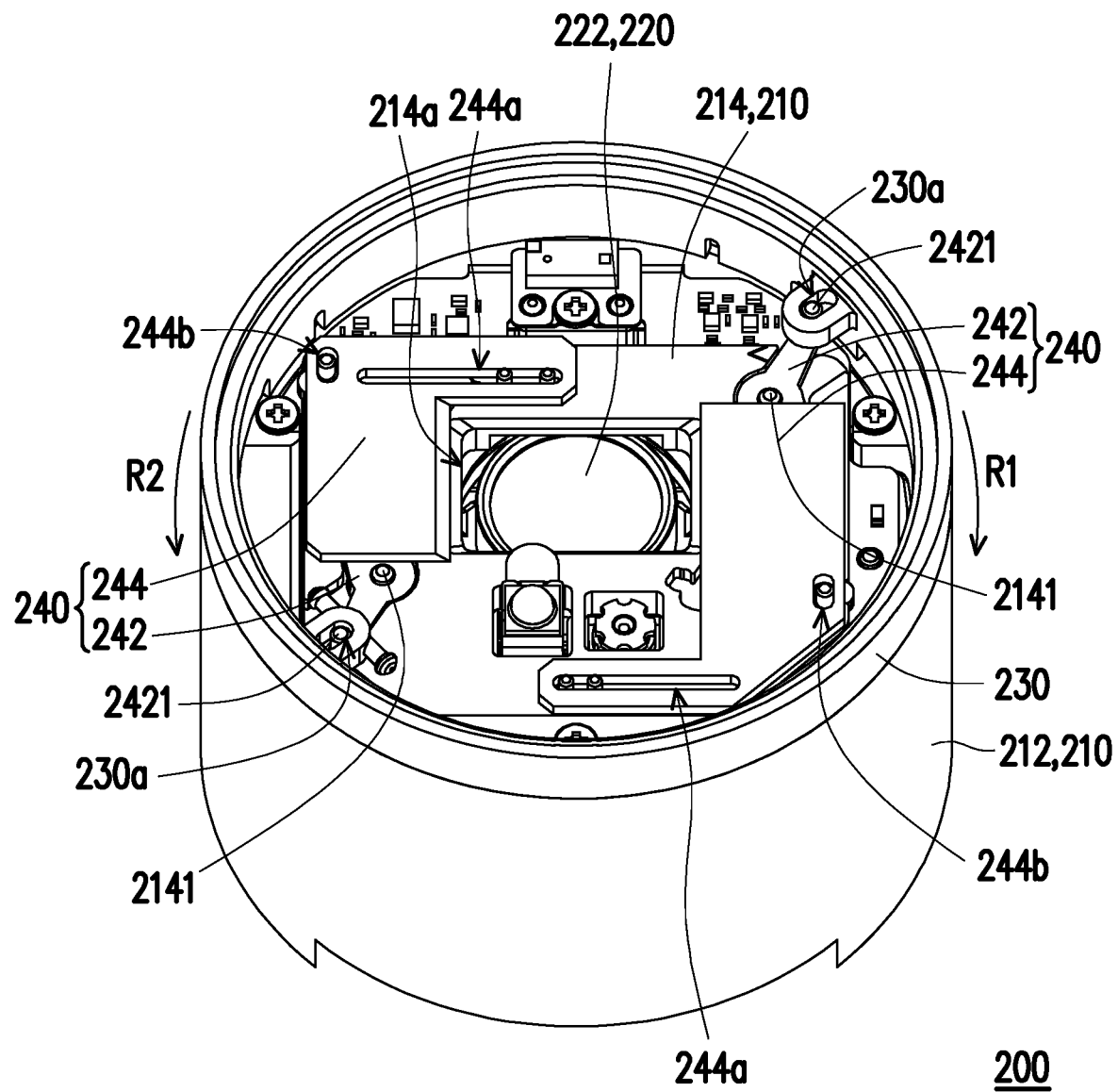
FIG. 9 is a perspective view of some members of the image capturing module of FIG. 8.

FIG. 8 is an exploded view of an image capturing module according to another embodiment of the disclosure. FIG. 9 is a perspective view of some members of the image capturing module of FIG. 8. The main difference between an image capturing module 200 shown in FIG. 8 and FIG. 9 and the image capturing module 100 of the above embodiment is that the image capturing module 100 includes one shielding structures 140, and the image capturing module 200 includes two shielding structures 240. The image capturing module 200 will be described in detail below. With reference to FIG. 8 and FIG. 9, the image capturing module 200 of this embodiment includes a main casing 210, an image capturing unit 220, a knob cover 230, and two shielding structures 240. The main casing 210 includes a sleeve 212, a lower cover 214, an upper cover 216, and a light-transmissive plate 218. The image capturing unit 220 is disposed in the sleeve 212. The lower cover 214 is disposed at a top part of the sleeve 212 and covers the image capturing unit 220, and the lower cover 214 has an opening hole 214a. The opening hole 214a corresponds to a lens 222 of the image capturing unit 220. The upper cover 216 is disposed on the lower cover 214. The shielding structure 240 are disposed in the main casing 210 and located between the lower cover 214 and the upper cover 216. The knob cover 230 is rotatably connected to the main casing 210 and surrounds the lower cover 214 and the upper cover 216. The shielding structures 240 are movably connected to the knob cover 230.

Figure 10:
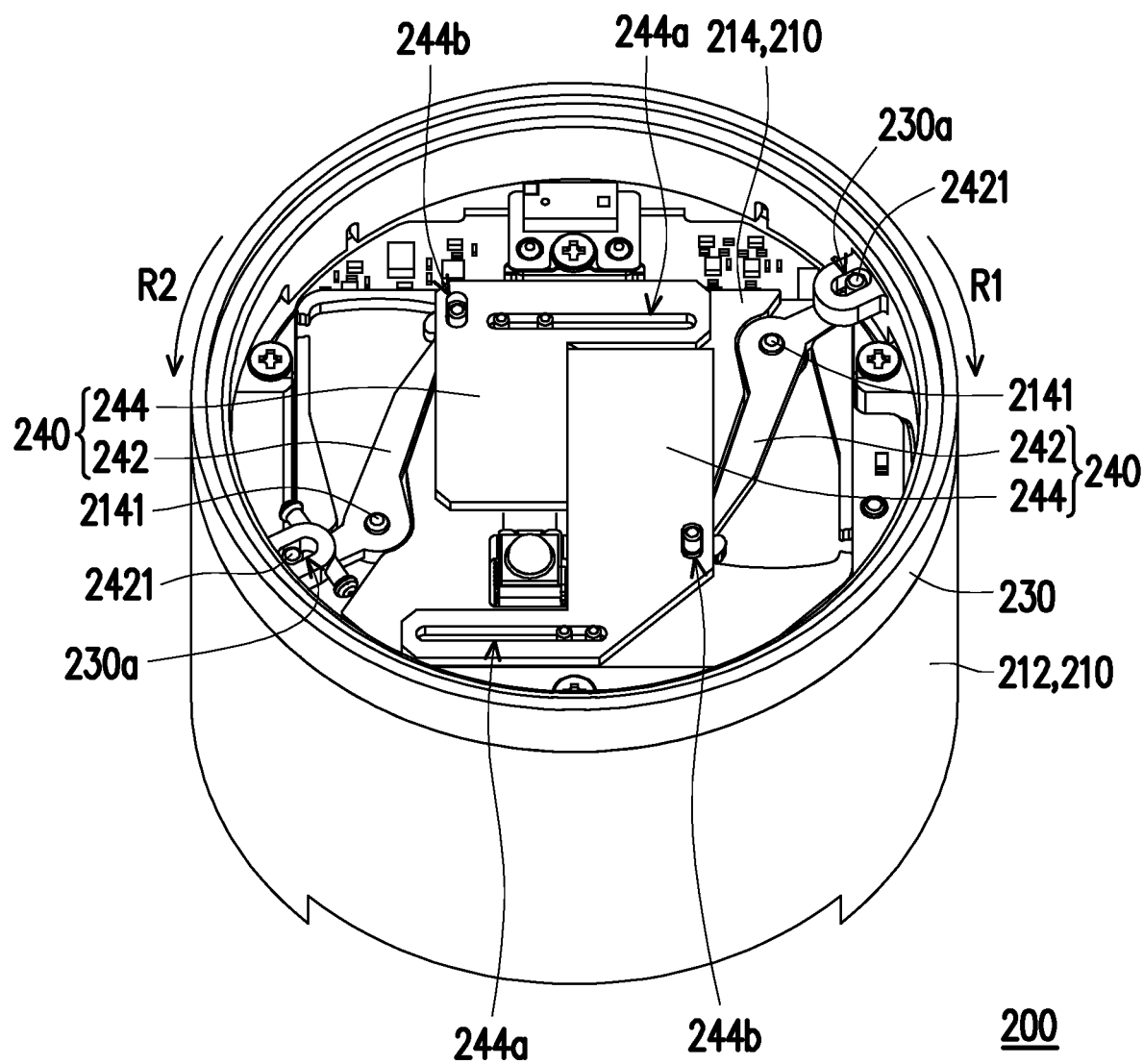
FIG. 10 shows the shielding structures of FIG. 9 actuated to a different state.

FIG. 10 shows the shielding structures of FIG. 9 actuated to a different state. When the image capturing module 200 is not in use, the user may apply a force to the knob cover 230 to rotate the knob cover 230 relative to the main casing 210 along the first rotational direction R1, driving the shielding structures 240 to be actuated from the state shown in FIG. 9 to the state shown in FIG. 10 to shield the opening hole 214a and the lens 222 of the image capturing unit 220, that is, to close the shutter. Moreover, when the image capturing module 200 is to be used, the user may apply a force to the knob cover 230 to rotate the knob cover 230 relative to the main casing 210 along the second rotational direction R2 opposite to the first rotational direction R1, driving the shielding structures 240 to be actuated from the state shown in FIG. 10 to the state shown in FIG. 9 to expose the opening hole 214a and the lens 222 of the image capturing unit 220, that is, to open the shutter.

Figure 11:
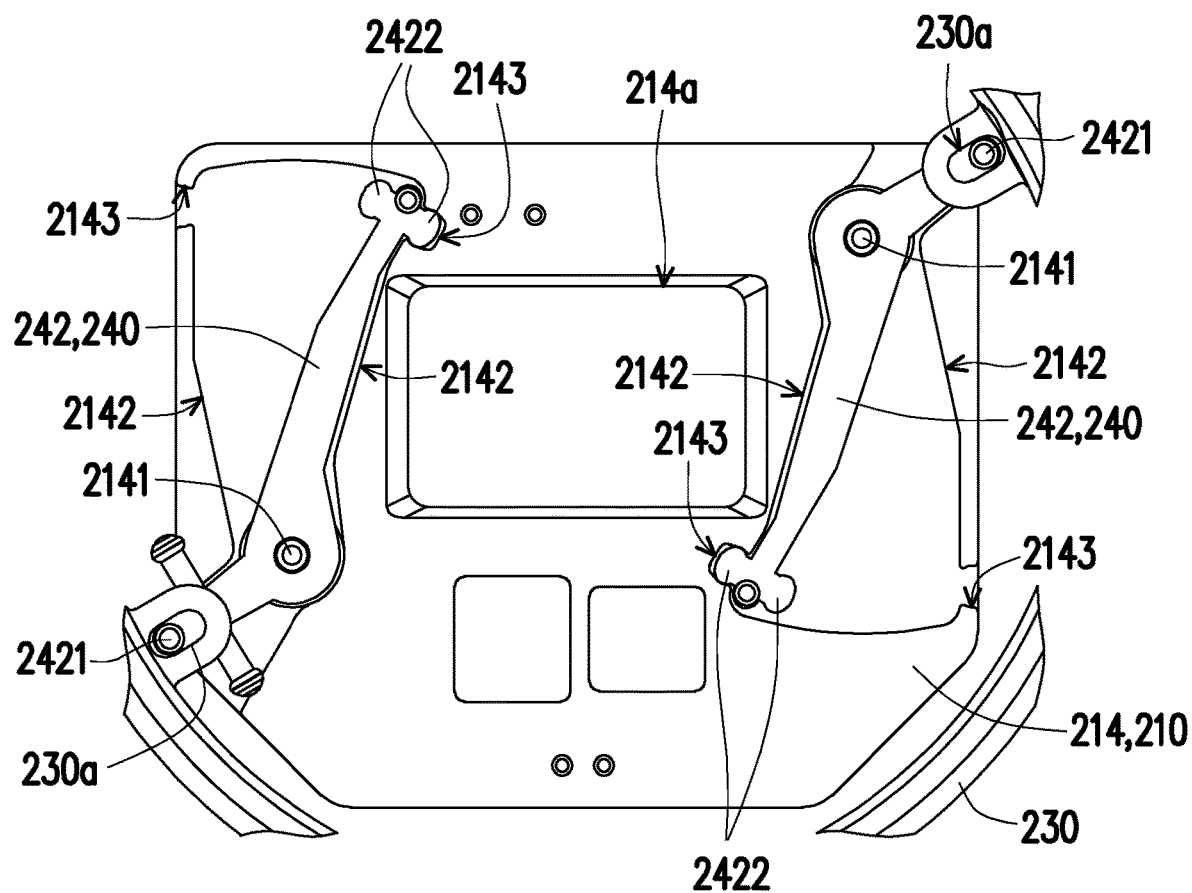
FIG. 11 and FIG. 12 are each a perspective view of a partial structure of the image capturing module of FIG. 10.
Figure 12:
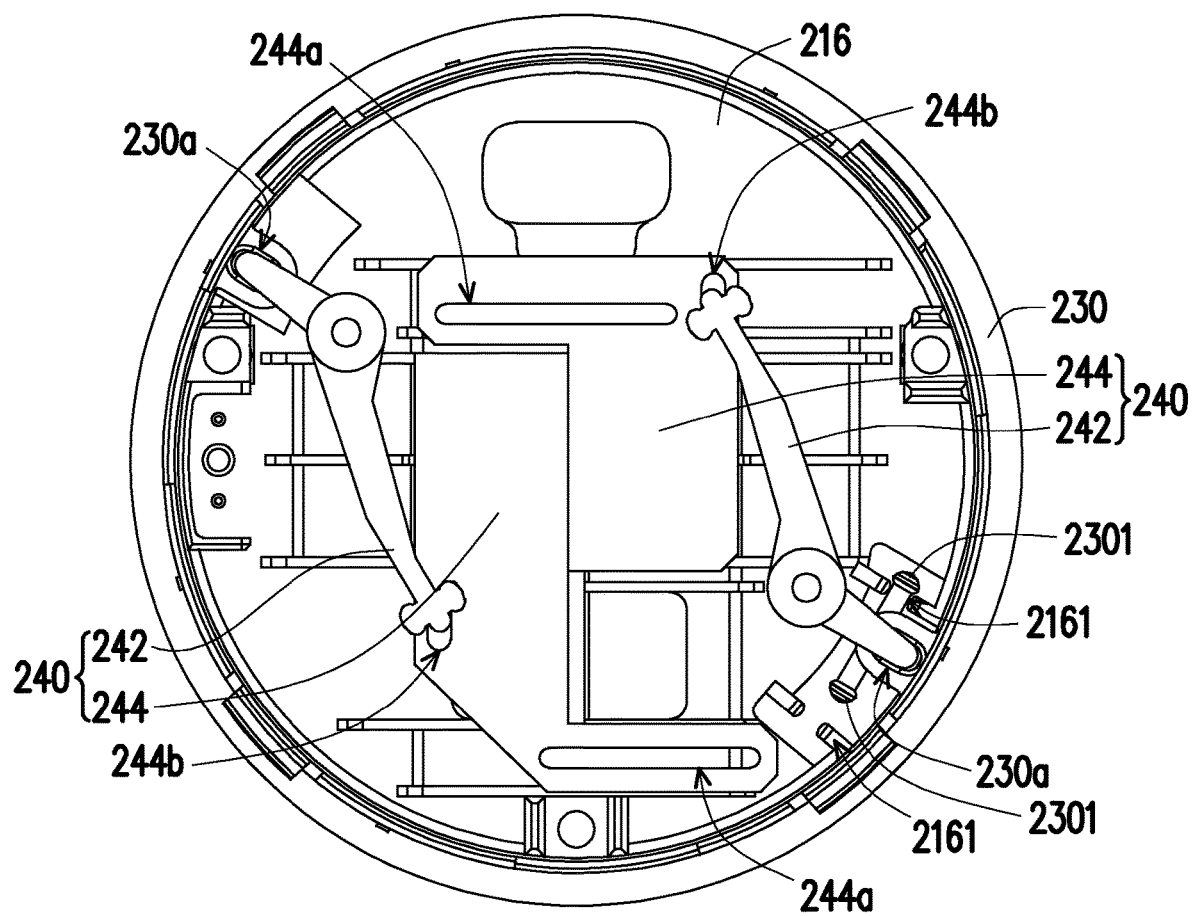

FIG. 11 and FIG. 12 are each a perspective view of a partial structure of the image capturing module of FIG. 10. With reference to FIG. 9 to FIG. 12, to be specific, each of the shielding structures 240 of this embodiment includes a linking rod 242 and a shielding member 244. The linking rod 242 has a connection pillar 2421 at one end of the linking rod 242. The knob cover 230 has two connection holes 230a. The connection pillar 2421 is rotatably and slidably connected to the corresponding connection hole 230a. The linking rod 242 is rotatably and slidably connected to the shielding member 244 at the other end of the linking rod 242. The linking rod 242 is pivotally connected to a protruding pillar 2141 of the lower cover 214. The shielding member 244 is translatably and slidably disposed on the lower cover 214. Therefore, when the knob cover 230 is rotated, the knob cover 230 drives the shielding member 244 to be translated between the state shown in FIG. 9 and the state shown in FIG. 10 by the linking rod 242. In this embodiment, for example, the shielding member 244 is slidably disposed on the lower cover 214 through its sliding groove 244*a*, and is rotatably and slidably connected to the linking rod 242 through its sliding groove 244*b*, which is not limited by the disclosure.

With reference to FIG. 11, in this embodiment, the lower cover 214 of the main casing 210 has a plurality of blocking walls 2142. When the shielding structures 240 shield the image capturing unit 220 as shown in FIG. 10 or expose the image capturing unit 220 as shown in FIG. 9, the blocking walls 2142 stop the linking rod 242 of the shielding structures 240 to achieve limiting of the actuation range of the shielding structures 240, to limit the position of the shielding structures 240 to the state shown in FIG. 9 or the state shown in FIG. 10.

In this embodiment, the upper cover 216 of the main casing 210 has a plurality of first positioning parts 2161 (shown as positioning slots in FIG. 12). The knob cover 230 has a corresponding second positioning part 2301 (shown as a positioning mushroom in FIG. 12). When the shielding structures 240 shield the image capturing unit 220 as shown in FIG. 10 or expose the image capturing unit 220 as shown in FIG. 9, the second positioning part 2301 is positioned at the first positioning part 2161 to prevent the shielding structures 240 from unexpected deviation from the state shown in FIG. 9 or the state shown in FIG. 10. Moreover, the feel of the user during operation can be improved by the positioning of the second positioning part 2301 and the first positioning parts 2161.

Similarly, the lower cover 214 of the main casing 210 of this embodiment further has a plurality of first positioning parts 2143 (shown as an undercut grooves in FIG. 11). The linking rod 242 of the shielding structures 240 has a corresponding second positioning part 2422 (shown as an undercut structure in FIG. 11). When the shielding structures 240 shield the image capturing unit 220 as shown in FIG. 10 or expose the image capturing unit 220 as shown in FIG. 9, the second positioning part 2422 is positioned at the first positioning part 2143 to prevent the shielding structures 240 from unexpected deviation from the state shown in FIG. 9 or the state shown in FIG. 10. Moreover, the feel of the user during operation can be improved by the positioning of the second positioning part 2422 and the first positioning parts 2143. In addition, the positioning of the positioning parts can also prevent the linking rod 242 from shaking during assembly to facilitate the assembly.

Figure 13:
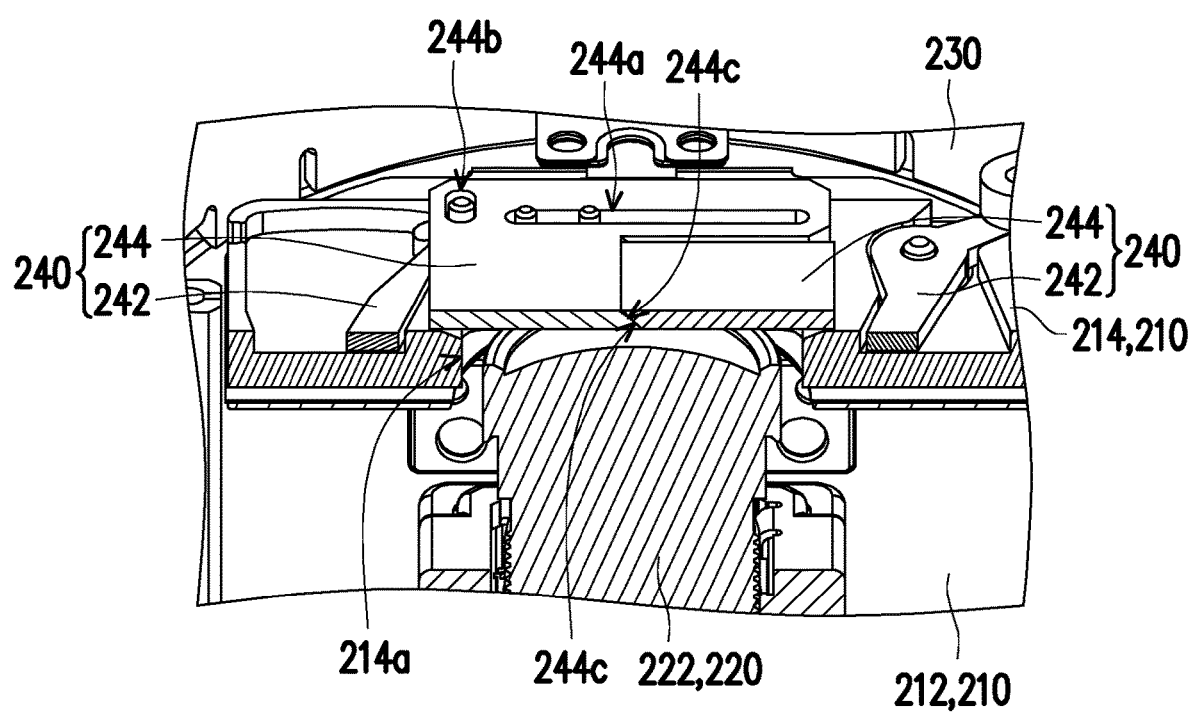
FIG. 13 is a perspective view of a partial structure of the image capturing module of FIG. 10.

FIG. 13 is a perspective view of a partial structure of the image capturing module of FIG. 10. With reference to FIG. 13, in this embodiment, the shielding member 244 of each of the shielding structures 240 has an inclined surface 244*c*. When the two shielding members 244 of the two shielding structures 240 jointly shield the lens 222 of the image capturing unit 220, the inclined surface 244*c* of the shielding member 244 of one shielding structure 240 leans against the inclined surface 244*c* of the other shielding structure 240 to prevent the lens 222 of the image capturing unit 220 from not being completely shielded because of misaligned closing between the two shielding members 244. An inclination angle of the inclined surface 244*c* of the shielding member 244 has, for example, a moderate angle of 10 to 60 degrees to prevent from an easily worn sharp corner of the shielding member 244 because of an overly great inclination angle of the inclined surface 244*c*, and also to prevent the lens 222 of the image capturing unit 220 from not being effectively shielded because of an insufficient inclination angle of the inclined surface 244*c*.

The rest parts of the configuration and operation of the image capturing module 200 of this embodiment are the same or similar to those of the image capturing module 100 of the above embodiment, and will not be repeatedly described here.

Figure 14:
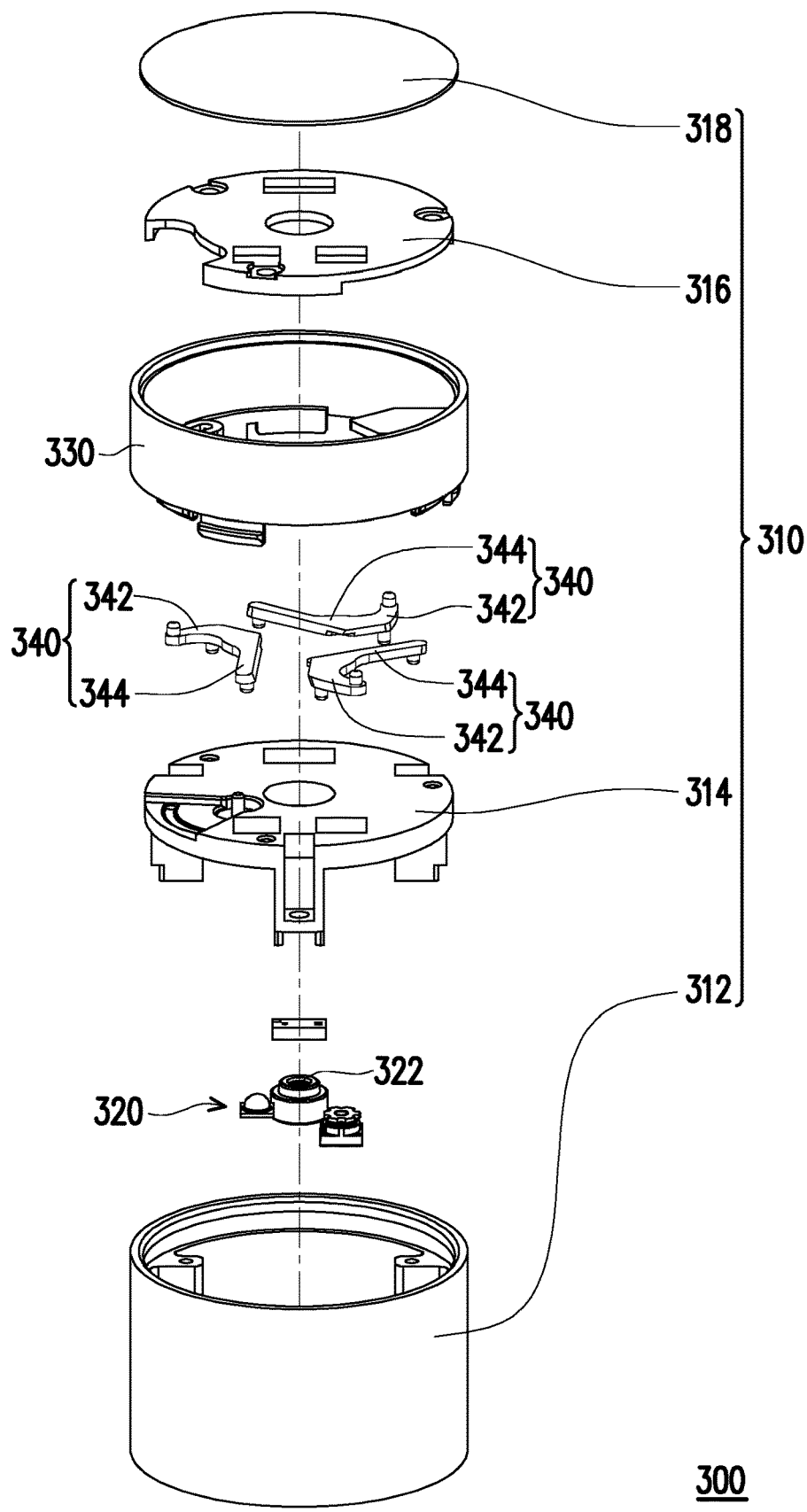
FIG. 14 is an exploded view of an image capturing module according to still another embodiment of the disclosure.
Figure 15:
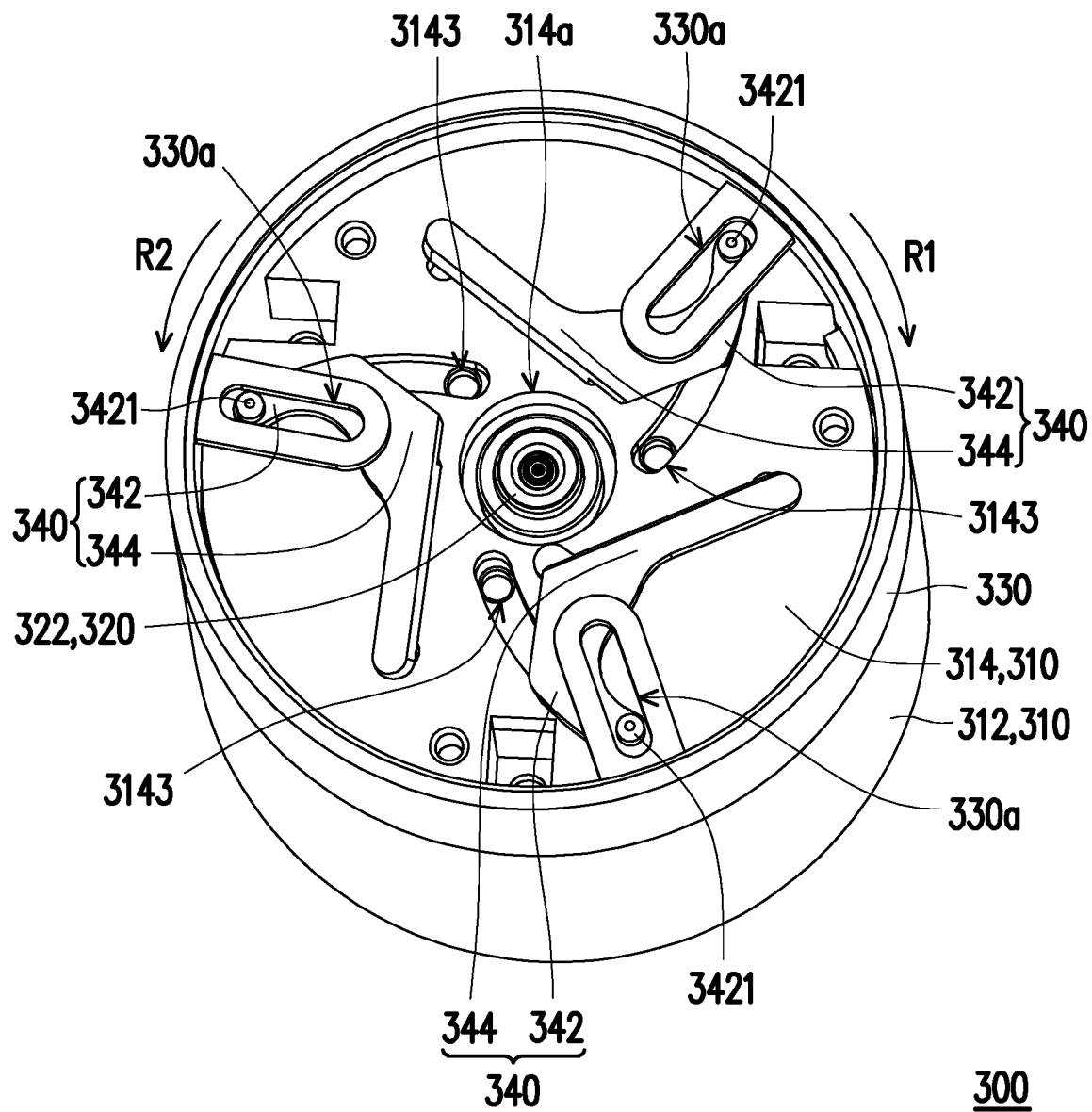
FIG. 15 is a perspective view of some members of the image capturing module of FIG. 14.

FIG. 14 is an exploded view of an image capturing module according to still another embodiment of the disclosure. FIG. 15 is a perspective view of some members of the image capturing module of FIG. 14. The main difference between an image capturing module 300 shown in FIG. 14 and FIG. 15 and the image capturing module 100 of the above embodiment is that the image capturing module 100 includes one shielding structures 140, and the image capturing module 300 includes three shielding structures 340. The image capturing module 300 will be described in detail below. With reference to FIG. 14 and FIG. 15, the image capturing module 300 of this embodiment includes a main casing 310, an image capturing unit 320, a knob cover 330, and three shielding structures 340. The main casing 310 includes a sleeve 312, a lower cover 314, an upper cover 316, and a light-transmissive plate 318. The image capturing unit 320 is disposed in the sleeve 312. The lower cover 314 is disposed at a top part of the sleeve 312 and covers the image capturing unit 320, and the lower cover 314 has an opening hole 314*a*. The opening hole 314*a* corresponds to a lens 322 of the image capturing unit 320. The upper cover 316 is disposed on the lower cover 314. The shielding structures 340 are disposed in the main casing 310 and located between the lower cover 314 and the upper cover 316. The knob cover 330 is rotatably connected to the main casing 310 and surrounds the lower cover 314 and the upper cover 316. The shielding structures 340 are movably connected to the knob cover 330.

Figure 16:
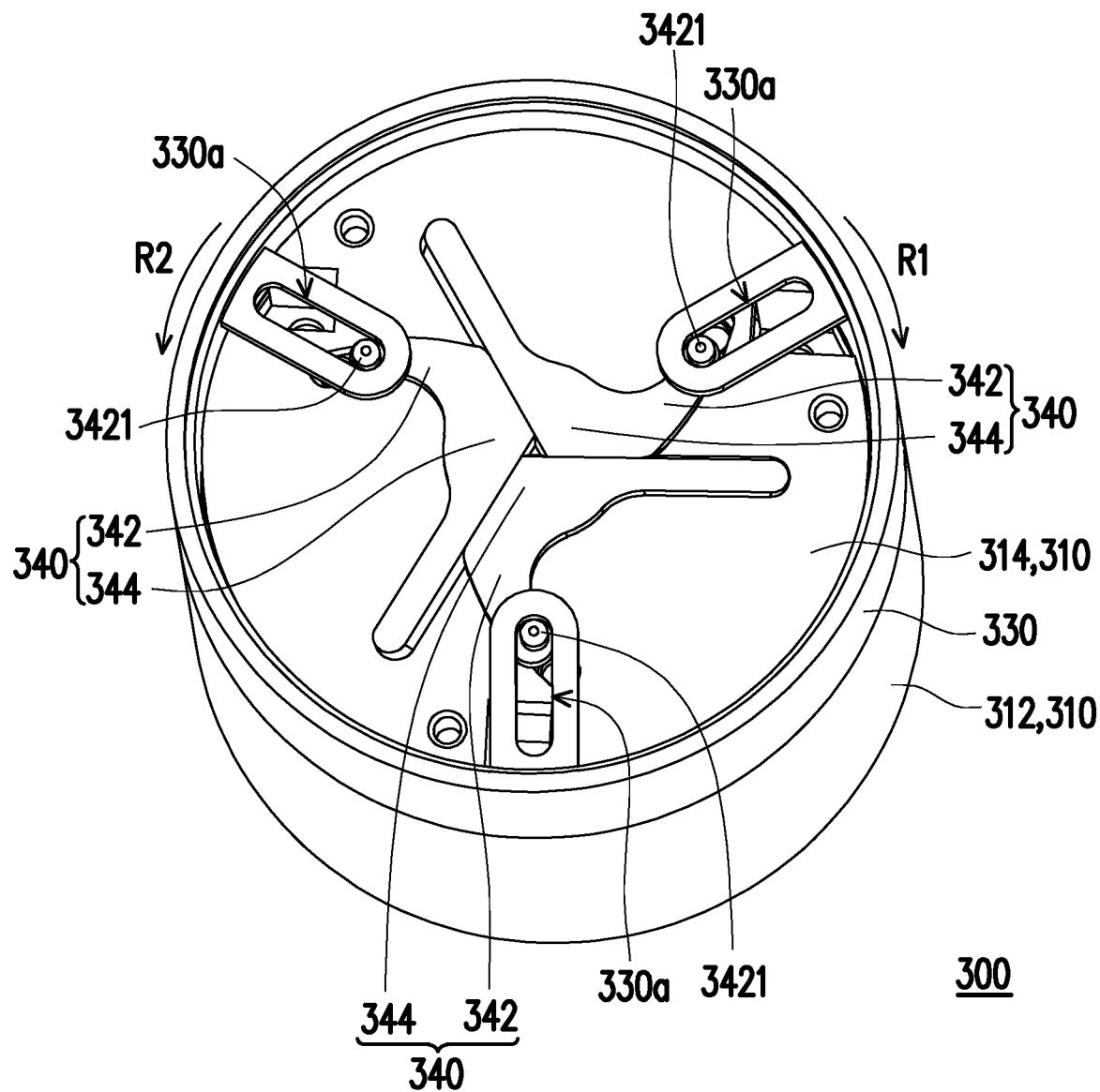
FIG. 16 shows the shielding structures of FIG. 15 actuated to a different state.

FIG. 16 shows the shielding structures of FIG. 15 actuated to a different state. When the image capturing module 300 is not in use, the user may apply a force to the knob cover 330 to rotate the knob cover 330 relative to the main casing 310 along the first rotational direction R1, driving the shielding structures 340 to be actuated from the state shown in FIG. 15 to the state shown in FIG. 16 to shield the opening hole 314*a* and the lens 322 of the image capturing unit 320, that is, to close the shutter. Moreover, when the image capturing module 300 is to be used, the user may apply a force to the knob cover 330 to rotate the knob cover 330 relative to the main casing 310 along the second rotational direction R2 opposite to the first rotational direction R1, driving the shielding structures 340 to be actuated from the state shown in FIG. 16 to the state shown in FIG. 15 to expose the opening hole 314*a* and the lens 322 of the image capturing unit 320, that is, to open the shutter.

Figure 17:
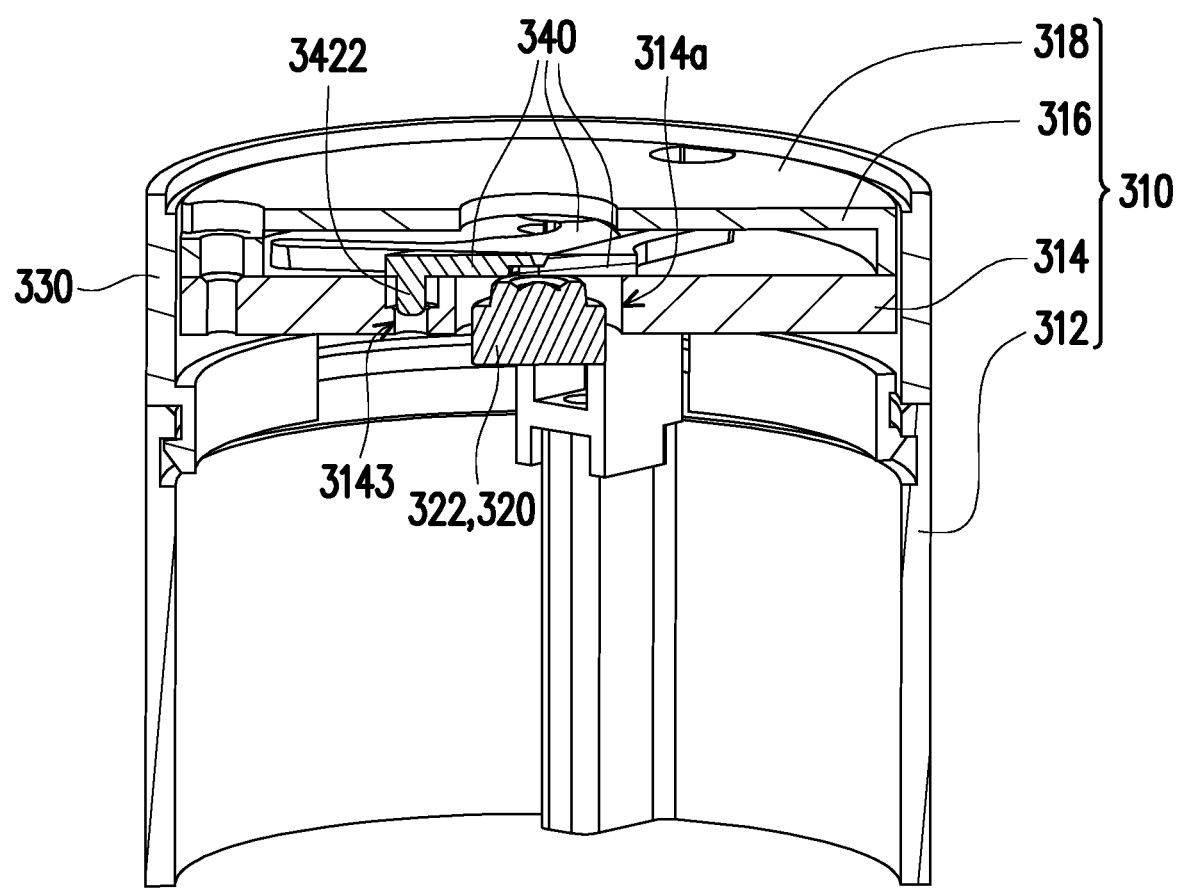
FIG. 17 is a perspective view of a partial structure of the image capturing module of FIG. 16.

FIG. 17 is a perspective view of a partial structure of the image capturing module of FIG. 16. With reference to FIG. 15 to FIG. 17, to be specific, each of the shielding structures 340 of this embodiment includes a linking rod 342 and a shielding member 344. The linking rod 342 has a connection pillar 3421 at one end of the linking rod 342. The knob cover 330 has three connection holes 330*a*. The connection pillar 3421 is rotatably and slidably connected to the corresponding connection hole 330*a*. The linking rod 342 is connected to the shielding member 344 at the other end of the linking rod 342. Therefore, when the knob cover 330 is rotated, the knob cover 330 drives the shielding member 344 to be rotated between the state shown in FIG. 15 and the state shown in FIG. 16 by the linking rod 342. In this embodiment, the linking rod 342 and the shielding member 344 are, for example, integrally formed to be connected to each other, which is not limited by the disclosure.

In this embodiment, the lower cover 314 of the main casing 310 further has a plurality of first positioning parts 3143 (shown as positioning holes in FIG. 15 to FIG. 17). Each of the shielding structures 340 has a corresponding second positioning part 3422 (shown as a positioning pillar in FIG. 17). When the shielding structures 340 shield the image capturing unit 320 as shown in FIG. 16 or expose the image capturing unit 320 as shown in FIG. 15, the second positioning part 3422 is positioned at the first positioning part 3143 to prevent the shielding structures 340 from unexpected deviation from the state shown in FIG. 15 or the state shown in FIG. 16. Moreover, the feel of the user during operation can be improved by the positioning of the second positioning part 3422 and the first positioning part 3143. In addition, the positioning of the positioning parts can also prevent the linking rod 342 from shaking during assembly to facilitate the assembly.

Figure 18:
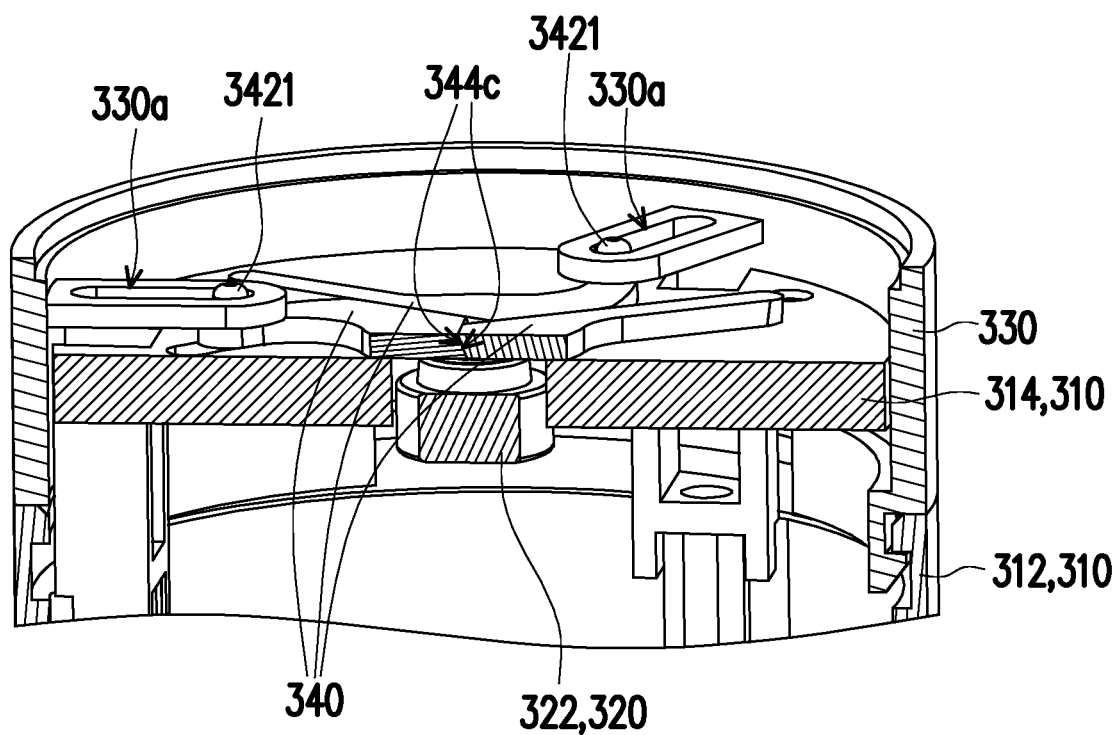
FIG. 18 is a perspective view of a partial structure of the image capturing module of FIG. 16.

FIG. 18 is a perspective view of a partial structure of the image capturing module of FIG. 16. With reference to FIG. 18, in this embodiment, each of the shielding structures 340 has an inclined surface 344c. When the three shielding structures 340 jointly shield the lens 322 of the image capturing unit 320, the inclined surface 344c of each of the shielding structures 340 leans against the inclined surfaces 344c of the other two shielding structures 340 to prevent the lens 322 of the image capturing unit 320 from not being completely shielded because of misaligned closing between the three shielding structures 340. An inclination angle of the inclined surface 344c of the shielding structures 340 has, for example, a moderate angle of 10 to 60 degrees to prevent from an easily worn sharp corner of the shielding structures 340 because of an overly great inclination angle of the inclined surface 344c, and also to prevent the lens 322 of the image capturing unit 320 from not being effectively shielded because of an insufficient inclination angle of the inclined surface 344c.

Figure 19:
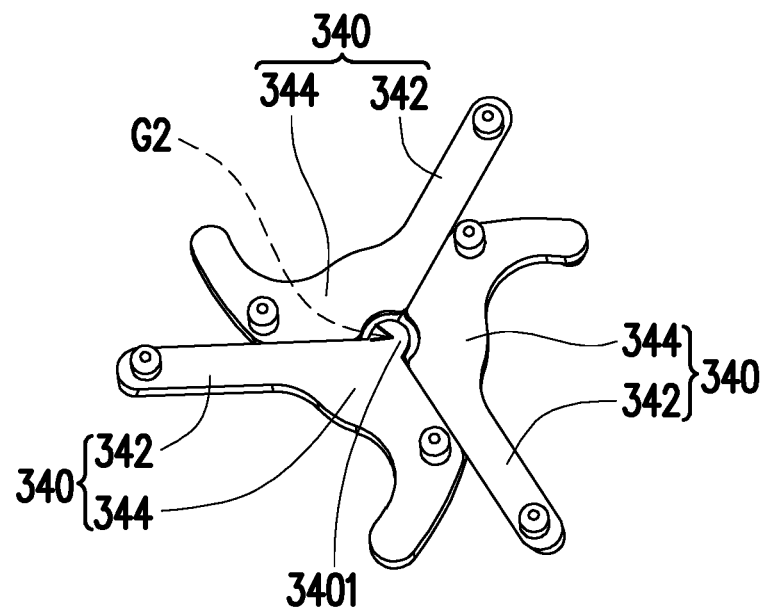
FIG. 19 is a perspective view of the shielding structures of FIG. 16 from another view angle.

FIG. 19 is a perspective view of the shielding structures of FIG. 16 from another view angle. With reference to FIG. 19, further, one of the three shielding structures 340 has an extension part 3401. When the shielding structures 340 jointly shield the lens 322 of the image capturing unit 320, the extension part 3401 covers a gap G2 between the shielding structures 340 to reliably shield the lens 322 of the image capturing unit 320.

The rest parts of the configuration and operation of the image capturing module 300 of this embodiment are the same or similar to those of the image capturing module 100 or the image capturing module 200 of the above embodiments, and will not be repeatedly described here.

The image capturing module 100 of the above embodiment is taken as an example below for description of the design of inclination angle adjustment thereof.

Figure 20:
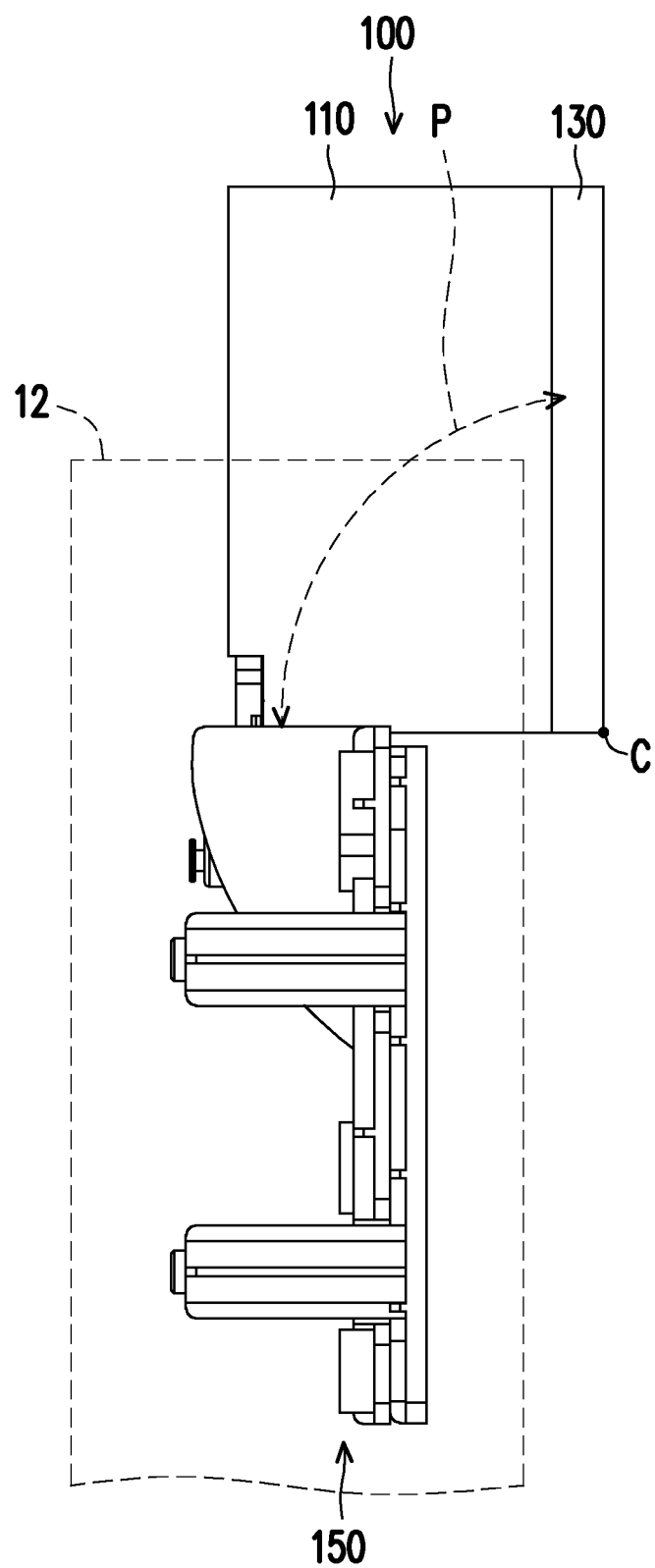
FIG. 20 is a partial side view of the electronic device of FIG. 1.
Figure 21:
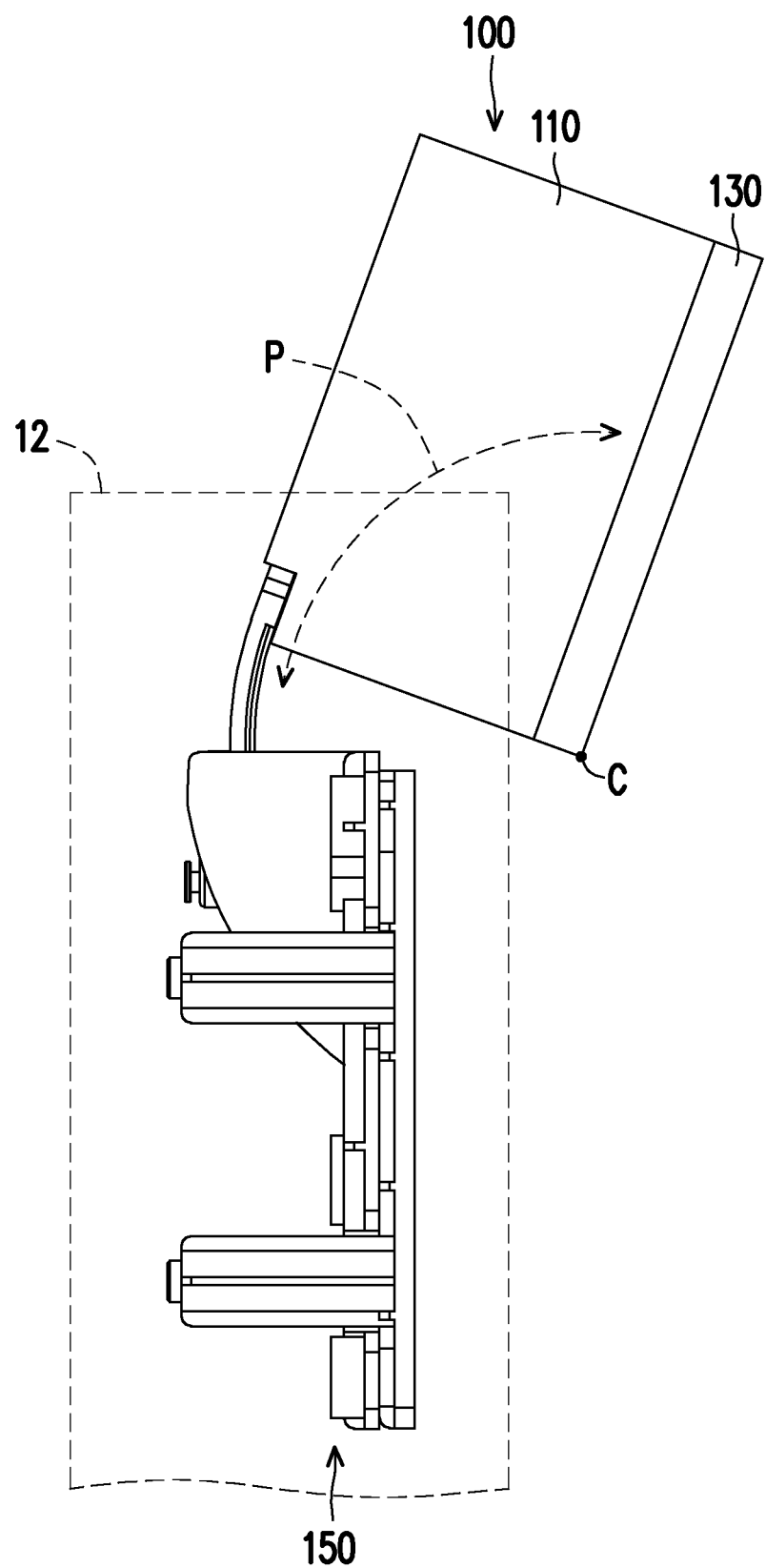
FIG. 21 shows a change of an inclination angle of the image capturing module of FIG. 20.

FIG. 20 is a partial side view of the electronic device of FIG. 1. FIG. 21 shows a change of an inclination angle of the image capturing module of FIG. 20. With reference to FIG. 20 and FIG. 21, the image capturing module 100 of this embodiment further includes a bracket 150. The bracket 150 is disposed on the top end of the display 12. The main casing 110 of the image capturing module 100 is slidably disposed on the bracket 150 along an arc-shaped sliding path P. An inclination angle of the image capturing module 100 is adapted to change between the state shown in FIG. 20 and the state shown in FIG. 21 as the main casing 110 slides along the arc-shaped sliding path P. A center of curvature C of the arc-shaped sliding path P (i.e., a center of rotation of the image capturing module 100) is located, for example, at a corner of the image capturing module 100. Therefore, regardless of how the user adjusts the inclination angle of the image capturing module 100, the position of the corner of the image capturing module 100 may not move, ensuring that the view angle of the image capturing module 100 covers the user. In addition, regardless of how the user adjusts the inclination angle of the image capturing module 100, the location of the image capturing module 100 as a whole may not be overly shifted, ensuring coordination of the overall appearance of the electronic device 10.

Figure 22:
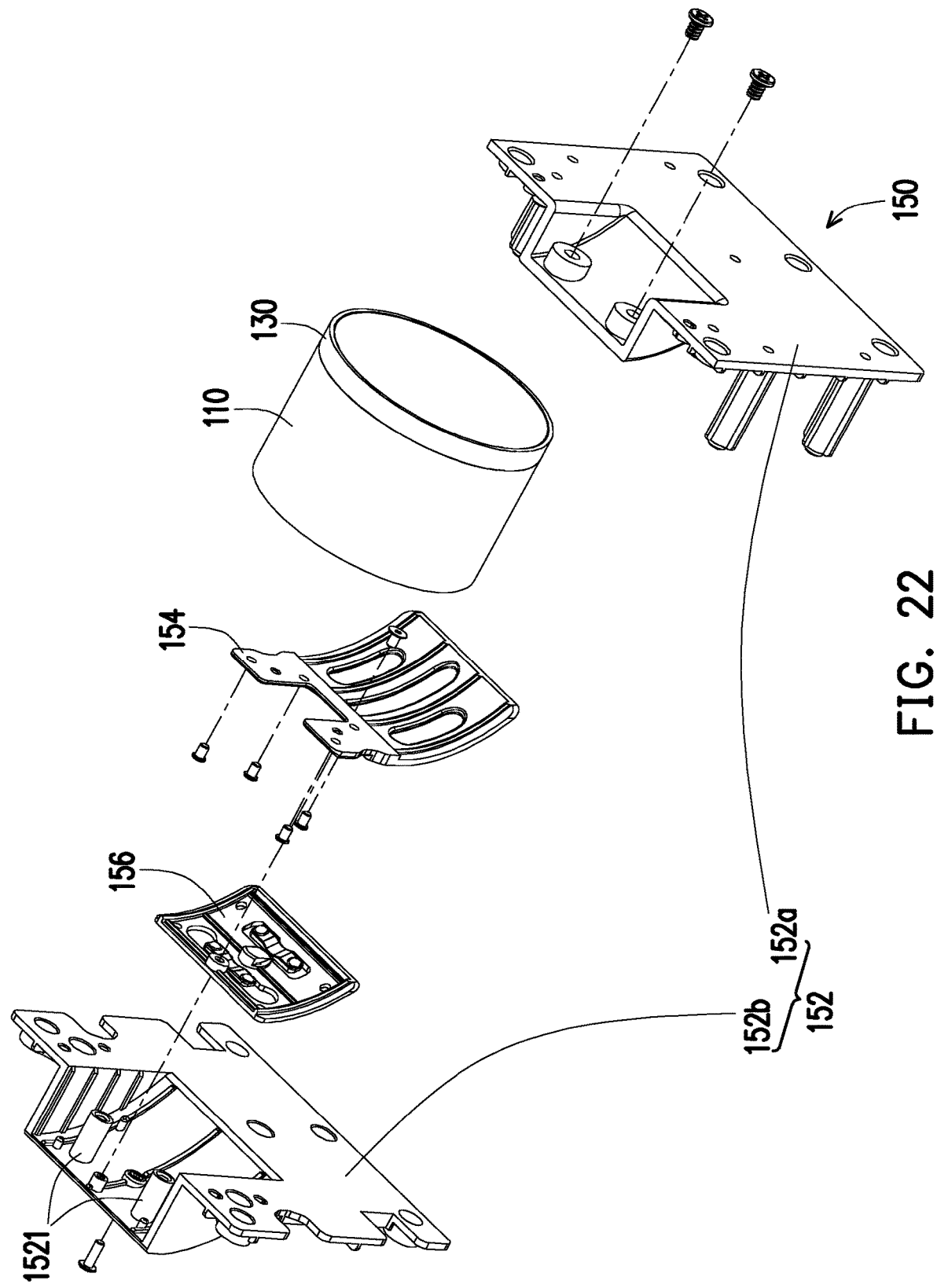
FIG. 22 is an exploded view of the image capturing module of FIG. 20.
Figure 23:
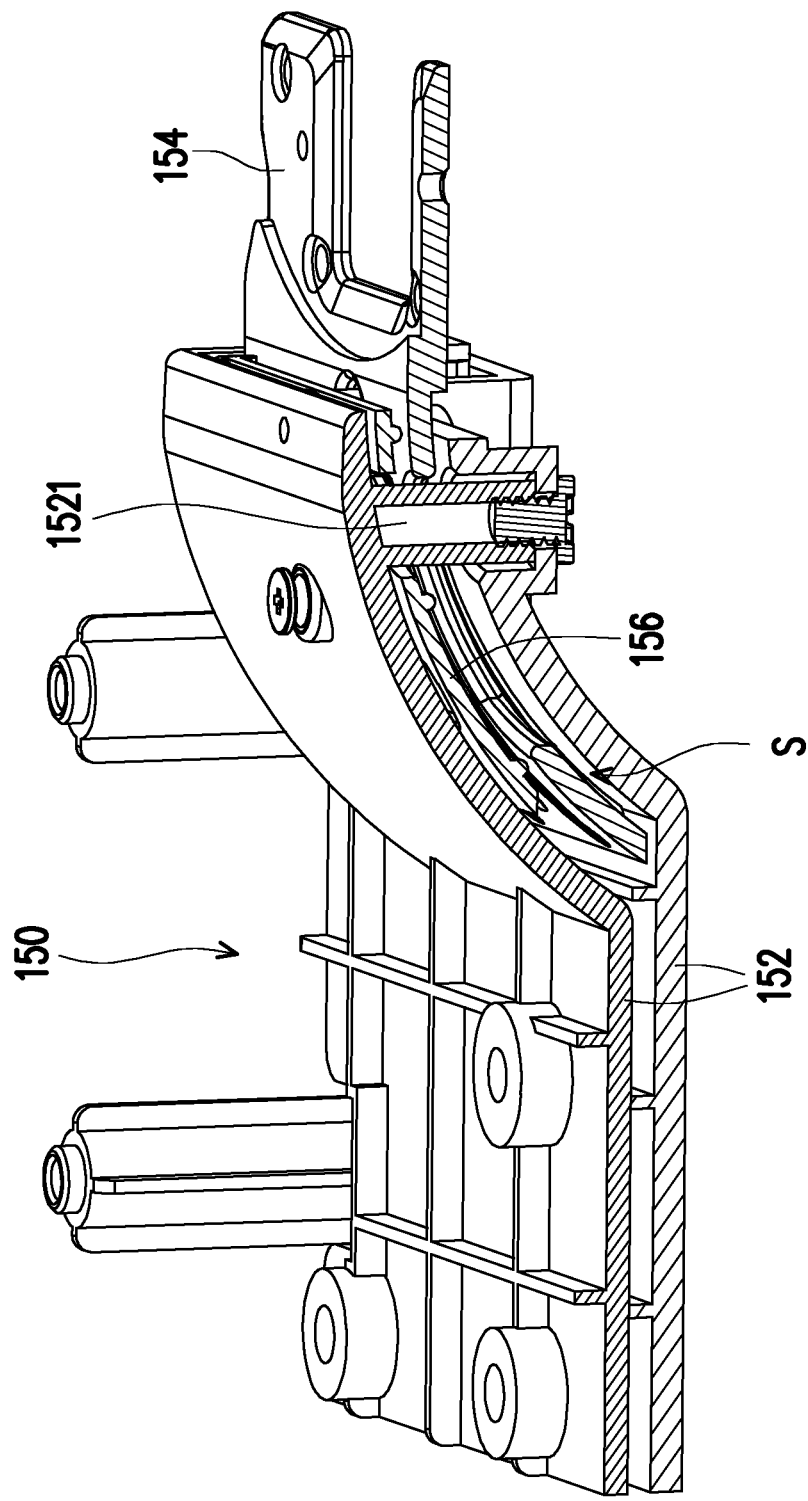
FIG. 23 and FIG. 24 are respectively perspective views of a partial structure of the image capturing module of FIG. 20 and FIG. 21.
Figure 24:
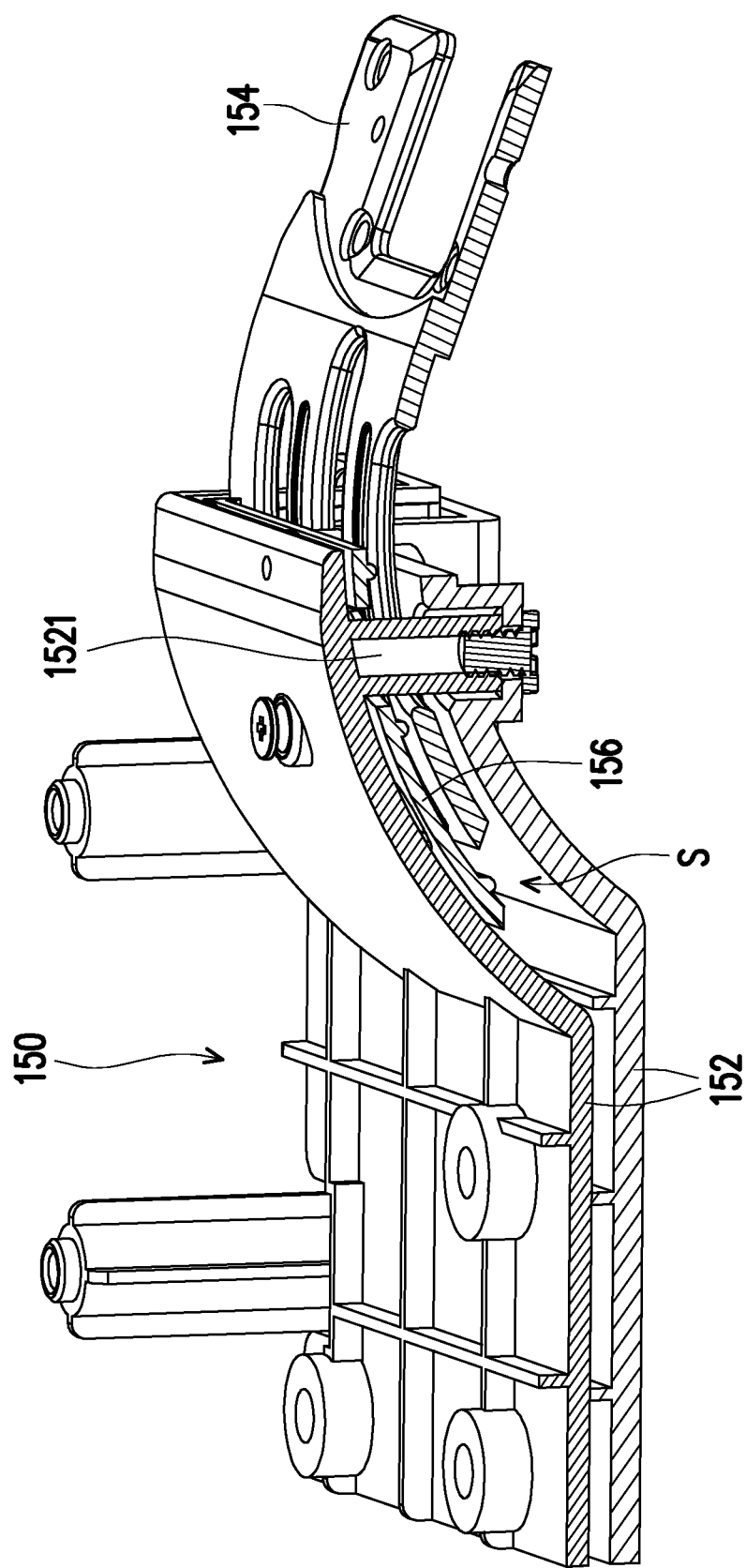

FIG. 22 is an exploded view of the image capturing module of FIG. 20. FIG. 23 and FIG. 24 are respectively perspective views of a partial structure of the image capturing module of FIG. 20 and FIG. 21. With reference to FIG. 22 to FIG. 24, the bracket 150 of this embodiment includes a first assembly 152 and a second assembly 154. The first assembly 152 includes a front cover 152a and a back cover 152b assembled to each other, and has an arc-shaped sliding space S located between the front cover 152a and the back cover 152b. The arc-shaped sliding space S is configured to define the arc-shaped sliding path P. The second assembly 154 is slidably disposed in the arc-shaped sliding space S. The main casing 110 of the image capturing module 100 is fixed on the second assembly 154 and is slidable along the arc-shaped sliding path P with the second assembly 154.

Figure 25:
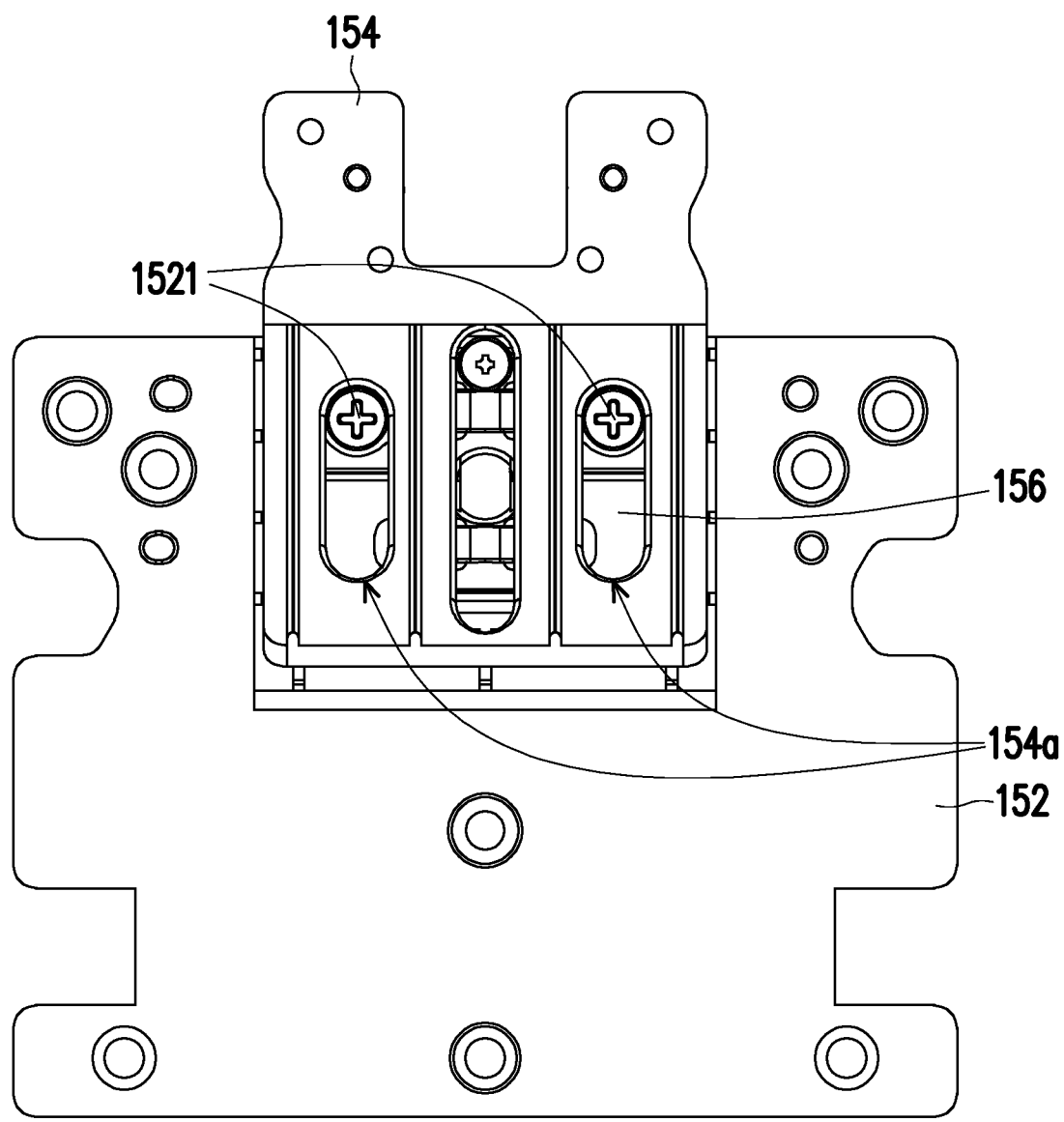
FIG. 25 and FIG. 26 are respectively front views of a partial structure of the image capturing module of FIG. 20 and FIG. 21.
Figure 26:
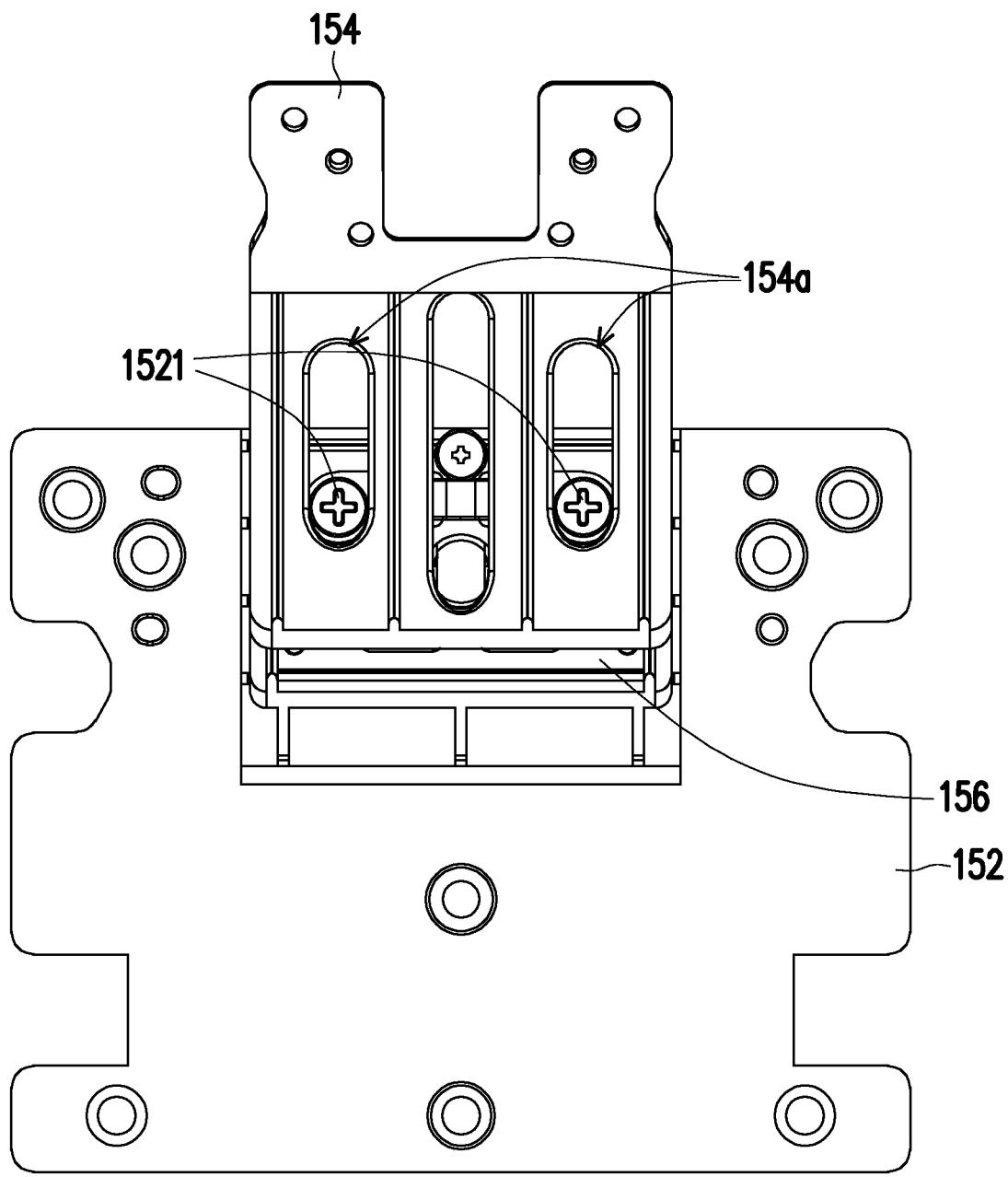

FIG. 25 and FIG. 26 are respectively front views of a partial structure of the image capturing module of FIG. 20 and FIG. 21. With reference to FIG. 23 to FIG. 26, the first assembly 152 of this embodiment has two pillar bodies 1521. The second assembly 154 has two arc-shaped sliding grooves 154a. The two pillar bodies 1521 are respectively disposed through the two arc-shaped sliding grooves 154a. Two opposite distal ends of each arc-shaped sliding groove 154a are adapted to stop the corresponding pillar body 1521 to limit a sliding range of the second assembly 154 relative to the first assembly 152. The length of the arc-shaped sliding groove 154a may be determined as required for a suitable sliding range of the second assembly 154, and for a suitable inclination angle adjustment range (e.g., 0 to 20 degrees) of the image capturing module 100. In addition, the bracket 150 of this embodiment further includes a friction member 156 as shown in FIG. 23 and FIG. 24. The friction member 156 is fixed on the first assembly 152 and contacts the second assembly 154 to fix the second assembly 154 at the position adjusted to by the user by the friction force provided by the friction member 156.

Figure 27:
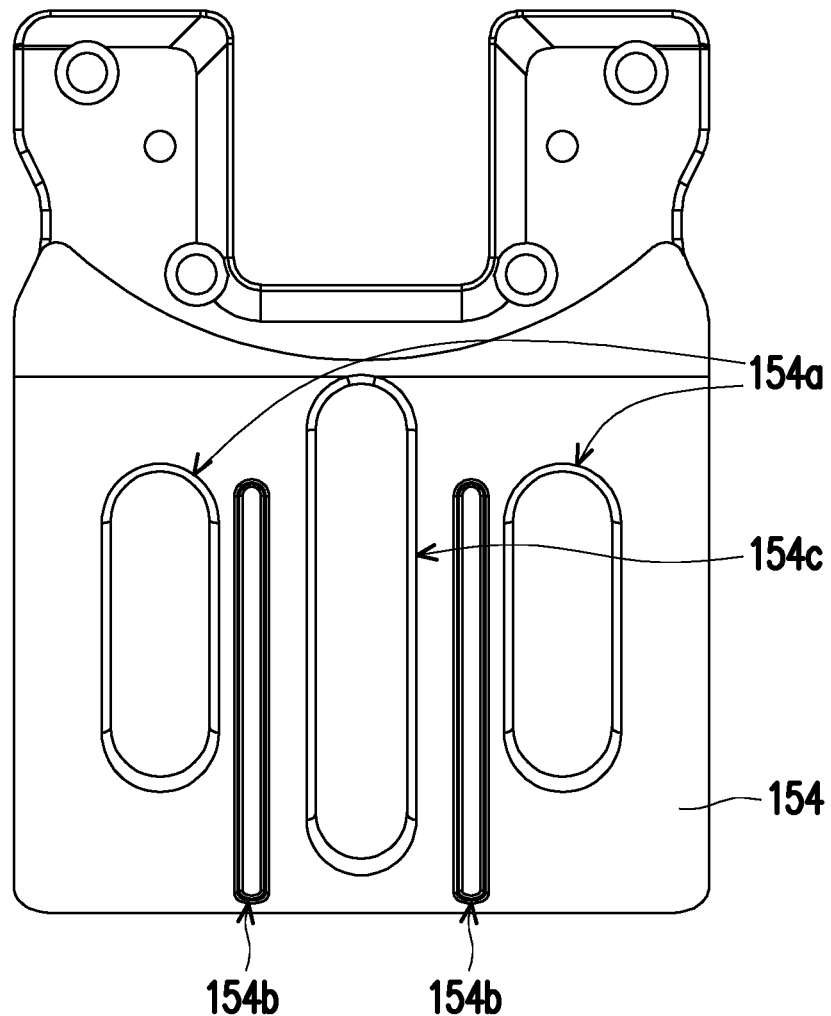
FIG. 27 is a front view of the first assembly of FIG. 20.
Figure 28:
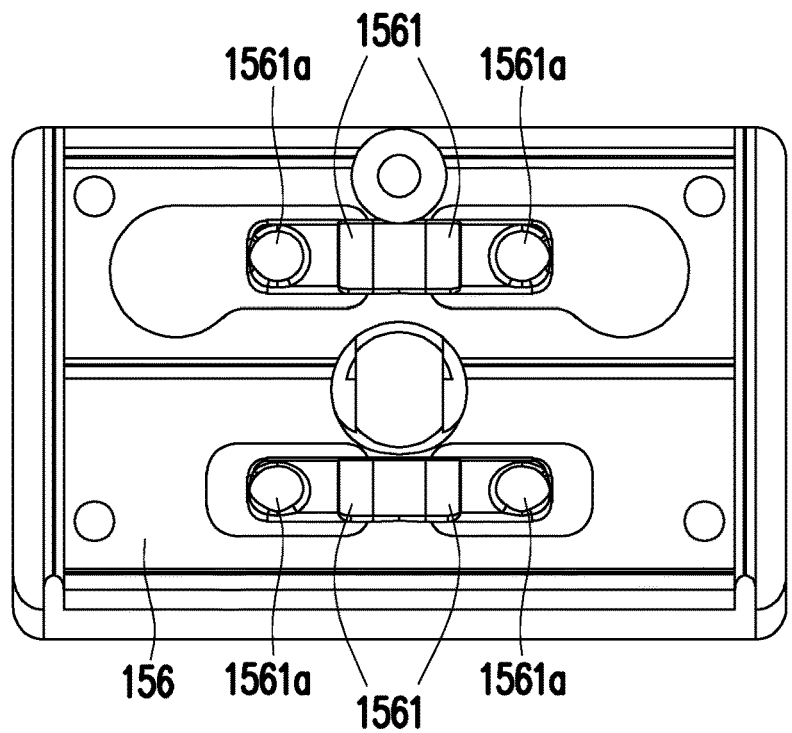
FIG. 28 is a front view of the friction member of FIG. 23.
Figure 29:
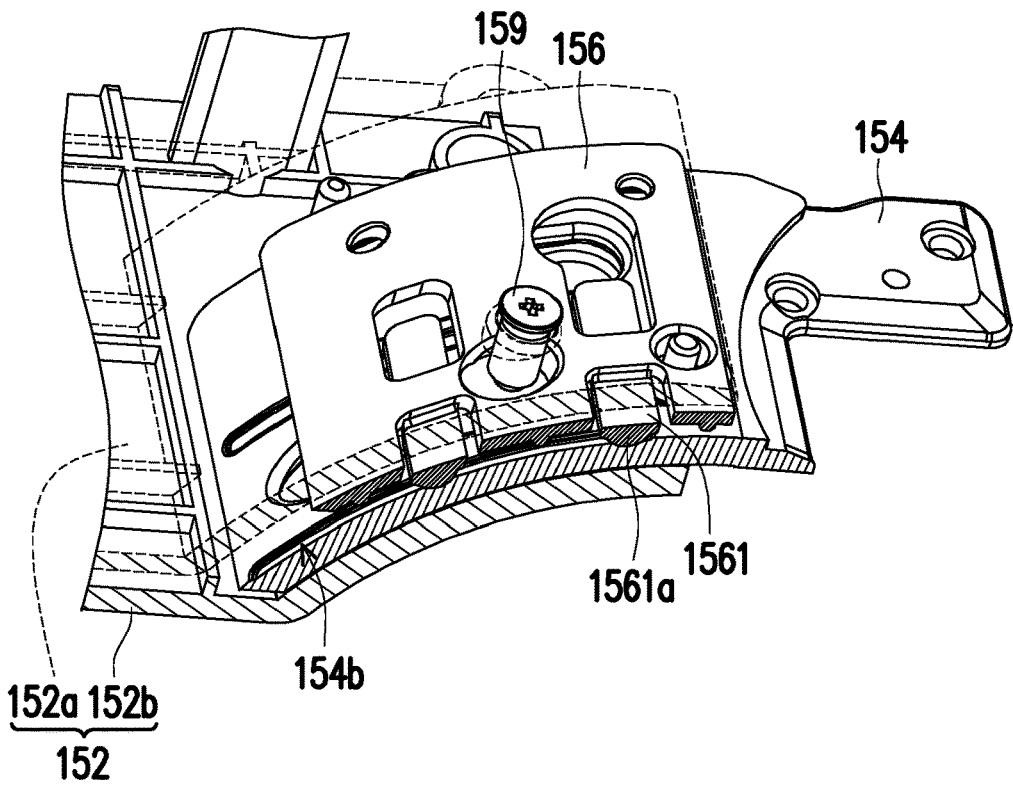
FIG. 29 is a perspective view of a partial structure of the bracket of FIG. 20.

FIG. 27 is a front view of the first assembly of FIG. 20. FIG. 28 is a front view of the friction member of FIG. 23. FIG. 29 is a perspective view of a partial structure of the bracket of FIG. 20. With reference to FIG. 27 to FIG. 29, to be specific, the friction member 156 of this embodiment has a plurality of elastic arms 1561. Each elastic arm 1561 has a bump 1561a thereon. The bump 1561a is configured to move along a friction groove 154b of the second assembly 154. The bump 1561a is tightly pressed against the friction groove 154b by the elastic force of the elastic arm 1561, therefore generating sufficient friction. The height of the bump 1561a and the depth of the friction groove 154b may be determined as required for a suitable amount of interference to accordingly provide a suitable amount of friction. In addition, the bracket 150 may further include a set screw 159. The set screw 159 passes through the back cover 152b, the friction member 156, and the second assembly 154, and is locked on the front cover 152a to apply a force to the friction member 156 in a direction toward the second assembly 154. The second assembly 154 has a receding groove 154c (shown in FIG. 27) configured for the set screw 159 to pass through. Moreover, the receding groove 154c has a suitable extension length, so that the second assembly 154 may smoothly slide relative to the first assembly 152. By adjusting the locking tightness of the set screw 159, the force applied by the set screw 159 to the friction member 156 in the direction toward the second assembly 154 may be changed, accordingly further adjusting the friction force. After being adjusted, the set screw 159 may be fixed with glue dispensing to prevent from loosening.

Figure 30:
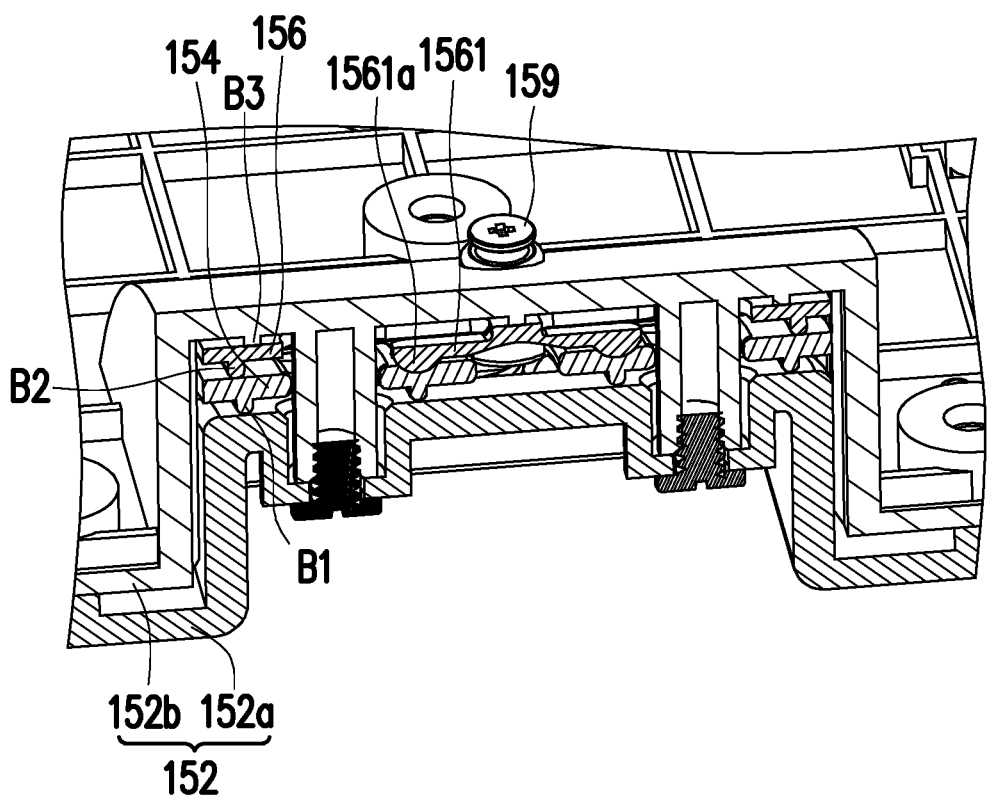
FIG. 30 is a perspective view of a partial structure of the bracket of FIG. 20.

FIG. 30 is a perspective view of a partial structure of the bracket of FIG. 20. With reference to FIG. 30, the second assembly 154 has a plurality of ribs B1 configured to contact the front cover 152a of the first assembly 152. Similarly, the friction member 156 has a plurality of ribs B2 configured to contact the second assembly 154. Similarly, the back cover 152b of the first assembly 152 has a plurality of ribs B3 configured to contact the friction member 156. Therefore, instead of a wide-range surface-contact, a local point-contact is achieved between the first assembly 152, the second assembly 154, and the friction member 156 by the ribs, which prevents an uneven contact force resulting from structural deformation.

In summary of the foregoing, in the image capturing module of the disclosure, the main casing is provided with the knob cover rotatable for the user and the shielding structure configured to shield the image capturing unit. The knob cover may drive the shielding structure to shield or expose the image capturing unit by manual operation of the user. In addition, the image capturing module includes the bracket for the main casing to be slidably disposed. The main casing is slidable relative to the bracket along the arc-shaped sliding path by manual operation of the user to accordingly adjust the inclination angle of the image capturing unit. Therefore, the image capturing module of the disclosure achieves control of shutter opening and closing and inclination angle adjustment with a simple and low-cost design.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image capturing module, comprising:
a main casing, has at least one first positioning part;
an image capturing unit disposed in the main casing;
a knob cover rotatably connected to the main casing; and
at least one shielding structure disposed on the main casing and movably connected to the knob cover, wherein the knob cover drives the at least one shielding structure to shield the image capturing unit,
wherein the at least one shielding structure or the knob cover has a second positioning part, and the at least one shielding structure is actuated relative to the image capturing unit to position the second positioning part at the at least one first positioning part.

2. The image capturing module according to claim 1, wherein the main casing has at least one blocking wall, and the at least one shielding structure is actuated relative to the image capturing unit to cause the at least one blocking wall to stop the at least one shielding structure.

3. The image capturing module according to claim 1, wherein the main casing has an opening hole, the opening hole corresponds to a lens of the image capturing unit, and the knob cover drives the at least one shielding structure to shield the opening hole.

4. The image capturing module according to claim 1, wherein one of the main casing and the knob cover has at least one arc-shaped groove part, the at least one arc-shaped groove part extends around a rotational axis of the knob cover, the other one of the main casing and the knob cover has at least one arc-shaped engaging part, the at least one arc-shaped engaging part extends around the rotational axis of the knob cover, and the at least one arc-shaped engaging part is engaged with the at least one arc-shaped groove part.

5. The image capturing module according to claim 4, wherein a gap is present between the at least one arc-shaped engaging part and the at least one arc-shaped groove part.

6. The image capturing module according to claim 1, wherein the knob cover has at least one connection hole, the at least one shielding structure has a connection pillar, and the connection pillar is rotatably and slidably connected to the at least one connection hole.

7. The image capturing module according to claim 1, wherein the at least one shielding structure comprises a linking rod and a shielding member, the linking rod is connected between the knob cover and the shielding member, and the knob cover is adapted to drive the shielding member to be translated by the linking rod.

8. The image capturing module according to claim 7, wherein the linking rod is movably connected to the shielding member, or the linking rod is integrally formed to be connected to the shielding member.

9. The image capturing module according to claim 1, wherein the at least one shielding structure comprises a linking rod and a shielding member, the linking rod is connected between the knob cover and the shielding member, and the knob cover is adapted to drive the shielding member to be rotated by the linking rod.

10. The image capturing module according to claim 9, wherein the linking rod is movably connected to the shielding member, or the linking rod is integrally formed to be connected to the shielding member.

11. The image capturing module according to claim 1, wherein the at least one shielding structure comprises a plurality of shielding structures, each of the shielding structures has an inclined surface, the shielding structures shield the image capturing unit, and the inclined surface of each of the shielding structures leans against the inclined surface of another one of the shielding structures.

12. The image capturing module according to claim 1, wherein the at least one shielding structure comprises a plurality of shielding structures, one of the shielding structures has an extension part, the shielding structures shield the image capturing unit, and the extension part covers a gap between the shielding structures.

13. An image capturing module, comprising:
a bracket;
a main casing slidably disposed on the bracket along an arc-shaped sliding path;
an image capturing unit disposed in the main casing, wherein an inclination angle of the image capturing module is adapted to change as the main casing slides along the arc-shaped sliding path;
a knob cover rotatably connected to the main casing; and
at least one shielding structure disposed on the main casing and movably connected to the knob cover, wherein the knob cover drives the at least one shielding structure to shield the image capturing unit.

14. The image capturing module according to claim 13, wherein the bracket comprises a first assembly and a second assembly, the first assembly has an arc-shaped sliding space, the second assembly is slidably disposed in the arc-shaped sliding space, and the main casing is fixed on the second assembly.

15. The image capturing module according to claim 14, wherein the first assembly has at least one pillar body, the second assembly has at least one arc-shaped sliding groove, the at least one pillar body is disposed through the at least one arc-shaped sliding groove, and two opposite distal ends of the at least one arc-shaped sliding groove are adapted to stop the at least one pillar body to limit a sliding range of the second assembly relative to the first assembly.

16. The image capturing module according to claim 14, wherein the second assembly has a plurality of ribs configured to contact the first assembly.

17. The image capturing module according to claim 14, wherein the bracket comprises a friction member, and the friction member is fixed on the first assembly and contacts the second assembly.

18. The image capturing module according to claim 17, wherein the friction member has a plurality of ribs configured to contact the second assembly, and the first assembly has a plurality of ribs configured to contact the friction member.

19. An electronic device, comprising:
a display; and
an image capturing module disposed at a top end of the display and comprising:
a main casing;
an image capturing unit disposed in the main casing;
a knob cover rotatably connected to the main casing;
a bracket disposed at the top end of the display, the main casing is slidably disposed on the bracket along an arc-shaped sliding path, and an inclination angle of the image capturing module is configured to change as the main casing slides along the arc-shaped sliding path; and
at least one shielding structure disposed on the main casing and movably connected to the knob cover, wherein the knob cover drives the at least one shielding structure to shield the image capturing unit.

* * * * *